US 6,721,092 B2
United States Patent
Aozasa et al.

(10) Patent No.: US 6,721,092 B2
(45) Date of Patent: Apr. 13, 2004

(54) THULIUM-DOPED FIBER AMPLIFIER USING PUMP LIGHT FOR IMPROVING CONVERSION EFFICIENCY IN A S-BAND

(75) Inventors: Shinichi Aozasa, Ibaraki-ken (JP); Hiroji Masuda, Ibaraki-ken (JP); Tadashi Sakamoto, Ibaraki-ken (JP); Makoto Shimizu, Ibaraki-ken (JP); Yoshiki Nishida, Ibaraki-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/079,209

(22) Filed: Feb. 20, 2002

(65) Prior Publication Data

US 2002/159137 A1 Oct. 31, 2002

(30) Foreign Application Priority Data

Feb. 21, 2001 (JP) ........................ 2001-044477
Mar. 19, 2001 (JP) ........................ 2001-079017

(51) Int. Cl.[7] ............................................ H01S 3/00
(52) U.S. Cl. ........................................ 359/341.5
(58) Field of Search ......................... 359/341.1, 341.5

(56) References Cited

U.S. PATENT DOCUMENTS

| 6,407,853 | B1 | * | 6/2002 | Samson et al. | ........ 359/341.31 |
| 6,411,429 | B1 | * | 6/2002 | Tomofuji et al. | ........... 359/337 |
| 6,466,363 | B1 | * | 10/2002 | Masum-Thomas et al. | . 359/334 |
| 6,476,960 | B1 | * | 11/2002 | Traynor et al. | ........ 359/341.31 |
| 6,501,596 | B1 | * | 12/2002 | Inoue et al. | ............. 359/341.5 |
| 6,515,795 | B1 | * | 2/2003 | Dejneka et al. | .......... 359/341.5 |
| 6,549,330 | B1 | * | 4/2003 | Choi et al. | ................... 359/343 |
| 2002/0001124 | A1 | * | 1/2002 | Kinoshita et al. | ........ 359/337.1 |
| 2002/0006259 | A1 | * | 1/2002 | Tirloni | ........................ 385/127 |

FOREIGN PATENT DOCUMENTS

JP        2000-340865       8/2000    ............. H01S/3/06

OTHER PUBLICATIONS

Kasamatsu et al. Gain–Shifted Dual–Wavelength–PUmped Thulium–Doped Fiber Amplifier for WDM Signals in the 1.48–1.51 micron Wavlength region. IEEE Photonics Technology Letters. vol. 13, No. 1, Jan. 2001. pp. 31–33.*

Sakamoto, T. S–band fiber optic amplifiers. OFCC 2001. Mar. 17–22, 2001. TuQ–1–1 to TuQ1–4. vol. 2.*

Kani et al. Wideband and flat–gain optical amplification from 1460 to 1510 by serial combination of a thulium–doped fluoride fibe amplifier and fibre Raman Amplifiers. Electronics Letters. Jun. 10th 1999. vol. 35. No. 12. pp. 1004–1006.*

S. A0zasa, C–3–142 Amplification characteristics of 1400 nm Pumped High $Tm^{3+}$ Concentration Doped Optical Fiber Amplifiers, The Institute of Electrics, Information and Communication Engineers General Meeting 2001, Mar. 7, 2001, p. 307.

Fibre Raman amplifier for 1520nm band WDM transmission; Electronic Letters,3[rd] Sep. 1998, vol. 34 No. 18.

(List continued on next page.)

Primary Examiner—Thomas G. Black
Assistant Examiner—Deandra M. Hughes
(74) Attorney, Agent, or Firm—Kilpatrick Stockton LLP

(57) ABSTRACT

An optical fiber amplifier with a high conversion efficiency, which is capable of using the pump light in the wavelength band that can be emitted by the laser diode, is formed by an amplification optical fiber containing thulium at least in a core, to which a signal light is to be entered, and a pump light input unit configured to enter at least one pump light with a wavelength in a range of 1320–1520 nm, or more preferably 1320–1480 nm, into the amplification optical amplifier.

11 Claims, 26 Drawing Sheets

OTHER PUBLICATIONS

Novel 1.50–Band Gain—Shifted Thulium–Doped Fiber Amplifier by Using Dual Wavelenght Pumping of 1.50 and 1.56μ Optical Amplifiers and their Applications; vol. 30, pp. 46–50, 1999.

Laser–diode pumping (1.4 and 1.56pm) of Grain–Sifted Thulium–Doped fibre amplifier. Electronic Letters, Sep. 14, 2000, vol. 36, No. 19.

Gain–Shifted Thulium–doped Fibre Amplifiers Employing Novel High Concentration Doping Technique. Electronic Letters Mar. 2, 2000, vol. 36 No. 5.

The Institute of Electronics, Information and Communication Engineers General Meeting 2001, C–3–142 Amplification Characteristics of 1400 nm Pumped High TM3—Concentration Doped Fiber Amplifiers.

* cited by examiner

FIG.4

| CONCENTRATION | WAVELENGTH | ZBLAN GLASS | In-Pb GLASS | TELLURITE GLASS |
|---|---|---|---|---|
| 2000 ppm wt | 1400nm BAND | 26% | 17% | 4% |
| | 1000nm BAND | 6% | 4% | 1% |
| 3000 ppm wt | 1400nm BAND | 30% | 20% | 5% |
| | 1000nm BAND | 8% | 5% | 1% |

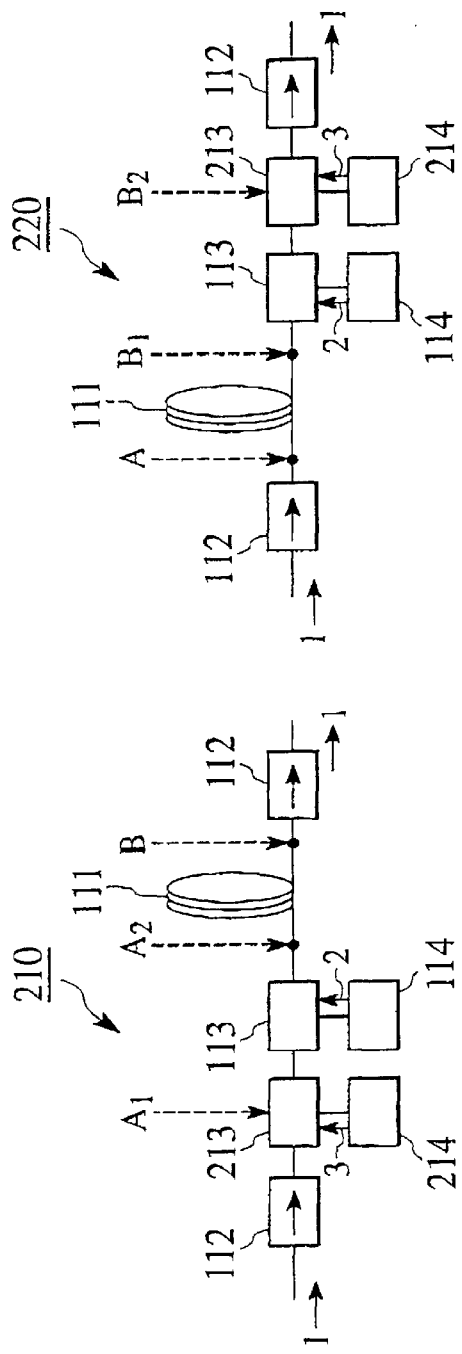
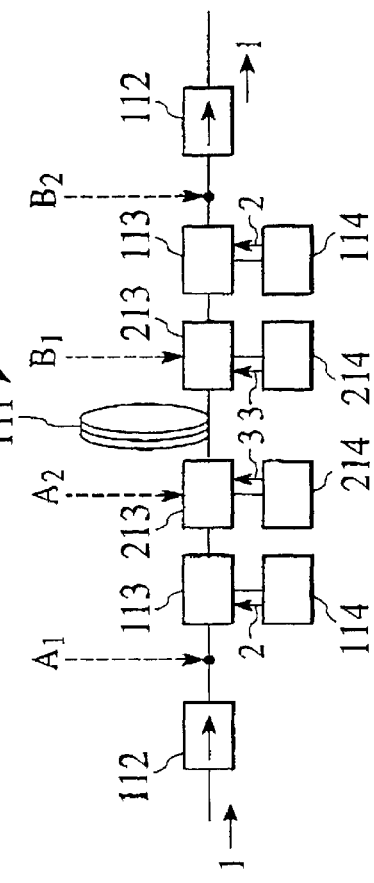
FIG.6A 210
FIG.6B 220
FIG.6C 230

FIG.8

| CONCENTRATION | WAVELENGTH | ZBLAN GLASS | In-Pb GLASS | TELLURITE GLASS |
|---|---|---|---|---|
| 2000 ppm wt | 650nm | 28% | 20% | 5% |
| | 800nm | 30% | 22% | 8% |
| | 1200nm | 33% | 25% | 10% |
| | 1560nm | 35% | 30% | 15% |
| | PUMP LIGHT 2 ONLY | 26% | 17% | 4% |
| 3000 ppm wt | 650nm | 35% | 25% | 10% |
| | 800nm | 40% | 30% | 15% |
| | 1200nm | 45% | 35% | 20% |
| | 1560nm | 50% | 40% | 25% |
| | PUMP LIGHT 2 ONLY | 30% | 20% | 5% |

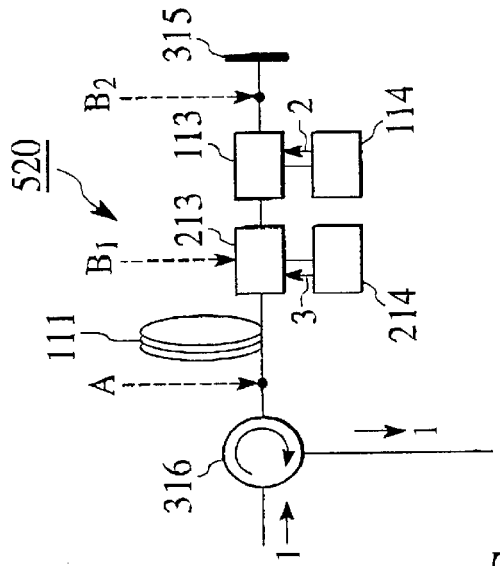
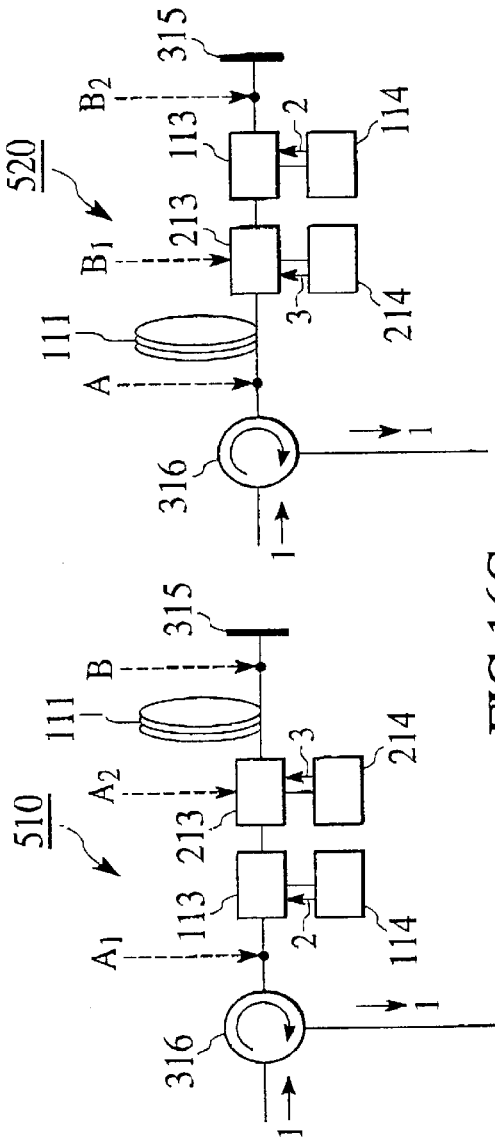
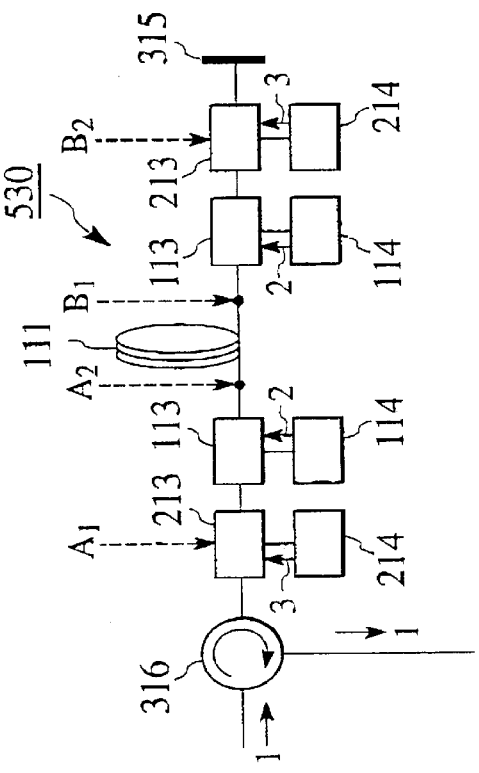

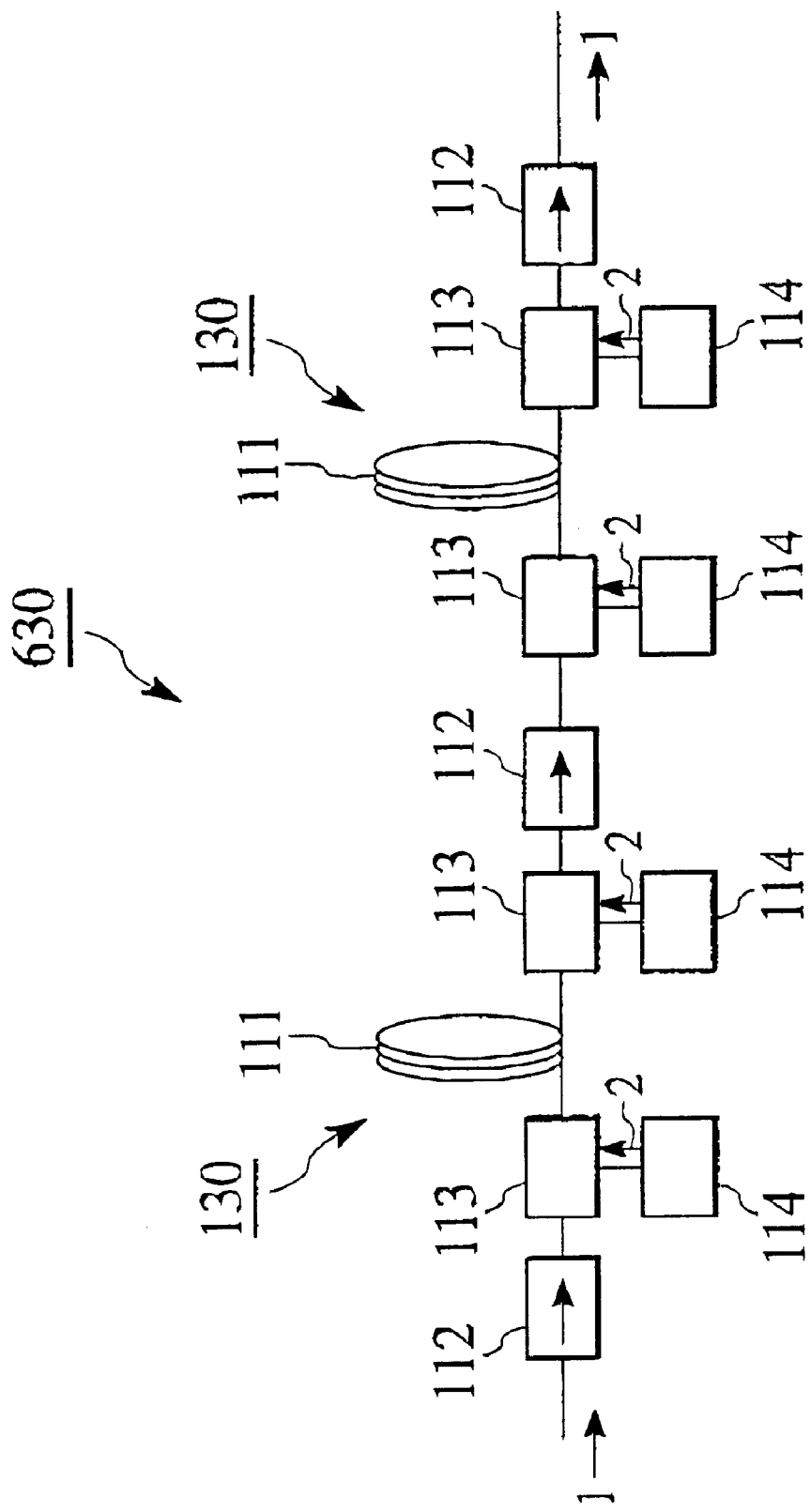

THULIUM-DOPED FIBER AMPLIFIER USING PUMP LIGHT FOR IMPROVING CONVERSION EFFICIENCY IN A S-BAND

BACKGROUND OF THE INVENTION

1. Field of the Invention

The present invention relates to a wideband optical fiber amplifier having an amplification bandwidth at 1480–1520 nm which is a low loss region of an optical fiber.

2. Description of the Related Art

In conjunction with the spread of the Internet, etc., the communication capacity has been increasing rapidly so that the use of a communication system in the WDM (Wavelength Division Multiplexing) scheme as a large capacity optical communication system is becoming popular. In this WDM system, it is indispensable to use an EDFA (Erbium-Doped Fiber Amplifier) as a repeater, and the WDM system with the EDFA having an amplification bandwidth of 1.53–1.60 μm has been available.

However, in order to realize a larger capacity for the communication facility, there is a need to enlarge the amplification bandwidth of the optical fiber amplifier, and there are great demands for a development of an optical fiber amplifier capable of covering a low loss region (1.45–1.65 μm) of a silica fiber.

To this end, an optical fiber amplifier adapted to an S-band (1480–1520 nm) in which the silica fiber has low loss and low dispersion equivalent to the already available C-band (1530–1560 nm) has been developed. There are currently three types of such an optical fiber amplifier in the S-band.

The first one is a Raman optical fiber amplifier that utilizes the induced Raman scattering that occurs when a signal light is entered into a silica fiber in a state of having an intense pump light incident thereon (see J. Kani, et al., Electronics Letters, Vol. 34, No, 18, pp. 1745–1747, September 1998, for example).

The second one is a dual wavelength pumped TDFA (Thulium-Doped Fiber Amplifier) in which the population inversion is low and the amplification bandwidth is shifted to the long wavelength side by adding wavelengths with a high efficiency for pumping from the ground level to the amplification final energy level in the TDFA with 1000 nm band upconversion pumping which has the amplification bandwidth at S⁻-band (1450–1480 nm) (see, T. Kasamatsu, et al., Optical Amplifiers and their Applications '99. Optical Society of America Trends In Optics and Photonics Series Vol. 30, pp. 46–50, June 1999, for example).

FIG. 1A shows the energy levels of Tm and the amplification state of the dual wavelength pumped TDFA. For the amplification of the S-band, the stimulated emission from $^3H_4$ to $^3SF_4$. In the case of the dual wavelength pumping, the signal light is pumped from the ground level $^3H_6$ to the amplification final energy level $^3F_4$ by the 1560 nm pump light, and then pumped from the amplification final energy level $^3F_4$ to the amplification initial energy level $^3F_2$ by the 1000 nm pump light. By controlling the powers of the pump lights in two wavelengths so as to control the number of Tm ions (Tm$^{3+}$) at each level, a low population inversion state is formed and the amplification bandwidth of the TDFA in the S⁺-band is shifted to the S-band.

Moreover, as shown in FIG. 1B, when the pumping wavelength from the amplification final energy level $^2F_4$ to the amplification initial energy level $^3F_2$ is changed from the 1000 nm band to the 1400 nm band which has the higher pumping efficiency, it is possible to realize the high efficiency S-band optical fiber amplifier (see, T. Kasamatsu, et al., Electronics Letters, Vol. 36, No. 19, pp. 1607–1609, September 2000, for example).

The third one is a high Tm$^{3+}$ concentration TDFA in which the low population inversion is formed by the cross relaxation among Tm$^{3-}$ generated In the pumping state and the amplification bandwidth is shifted to the S-band on the long wavelength region, by adding Tm which is the additive ions to the optical fiber core which is the amplification medium at a high Tm$^{3+}$ concentration, in the 1000 nm band upconversion pumping TDFA (see, S. Aozasa, et al., Electronics Letters, Vol. 36, No. 5, pp. 418–419, March 2000, for example).

FIG. 2 shows the energy levels of Tm and the amplification state of the high Tm$^3$ concentration TDFA. The signal light is pumped once from the ground level $^3H_6$ to the amplification final energy level $^3F_4$ by the 1000 nm pump light, and then pumped further from the amplification final energy level $^3F_4$ to the amplification initial energy level $^3F_2$ by the pump light of the same wavelength.

Now, in the low Tm$^{3+}$ concentration TDFA, the high population inversion is formed because the absorption of Tm$^{3-}$ with respect to the pump light at a time of pumping from the amplification final energy level $^3F_4$ to the amplification initial energy level $^3F_3$ is higher than the absorption of Tm$^{3+}$ with respect to the pump light at a time of pumping from the ground level $^3H_3$ to the amplification final energy level $^3F_4$.

Such a low Tm$^{3+}$ concentration TDFA has the amplification bandwidth mostly in the S⁺-band described above as a result of the high population inversion state, and the amplification operation can be realized even in the S-band although it is deviated from the peak wavelength of the gain spectrum. The amplification efficiency in the S-band by this low Tm$^{3+}$ concentration TDFA is less than or equal to that of the high Tm$^{3+}$ concentration TDFA.

In contrast, in the high Tm$^{3+}$ concentration TDFA, the interaction among Tm$^{3+}$ occurs so that, as shown in FIG. 2, Tm$^{3+}$ pumped to the amplification initial energy level $^3F_2$ is relaxed to the amplification final energy level $^3F_4$ by causing the energy transfer to the neighboring Tm$^{3-}$ at the ground level $^3H_6$, while Tm$^{3+}$ that received the energy is pumped to the amplification final energy level $^3F_4$. As a result, the number of Tm$^{3+}$ pumped to the amplification final energy level $^3F_4$ is increased so that the low population inversion is formed and the gain shirt occurs.

However, in the high Tm$^{3+}$ concentration TDFA described above, the laser diode (LD) for emitting the 1000 nm wavelength band to be used for the pump light has not been developed yet, so that its practical realization has been difficult because it is difficult to realize a low cost and a compact size, and the conversion efficiency is not very good (approximately 5%).

Also, even in the low Tm$^{3+}$ concentration TDFA, the laser diode (LD) for emitting the 1000 nm wavelength band to be used for the pump light has not been developed yet, so that its practical realization has been difficult because it is difficult to realize a low cost and a compact size, and the conversion efficiency in the S-band is less than or equal to the high Tm$^3$, concentration TDFA.

BRIEF SUMMARY OF THE INVENTION

It is therefore an object of the present invention to provide an optical fiber amplifier with a high conversion efficiency which is capable of using the pump light in the wavelength band that can be emitted by the laser diode.

According to one aspect of the present invention there is provided an optical fiber amplifier, comprising: an amplification optical fiber containing thulium at least in a core, to which a signal light is to be entered; and a pump light input unit configured to enter at least one pump light with a wavelength in a range of 1320–1520 nm into the amplification optical amplifier.

According to another aspect of the present invention there is provided an optical fiber amplifier, comprising: a plurality of amplification optical fibers each containing thulium at least in a core, to which a signal light is to be entered, the plurality of amplification optical fibers being connected in series or in parallel; and a plurality of pump light input units each configured to enter at least one pump light with a wavelength in a range of 1320–1520 nm into a respective one of the amplification optical amplifiers.

Other features and advantages of the present invention will become apparent from the following description taken in conjunction with the accompanying drawings.

BRIEF DESCRIPTION OF THE DRAWINGS

FIG. 4 is a table showing conversion efficiencies obtained by using exemplary optical fiber amplifiers of the first embodiment and conventional optical fiber amplifiers.

FIGS. 6A, 6B and 6C are schematic diagrams respectively showing forward pumping type, backward pumping type, and bidirectional pumping type configurations of an optical fiber amplifier according to the second embodiment of the present invention.

FIG. 8 is a table showing conversion efficiencies obtained by using exemplary optical fiber amplifiers of the second embodiment and exemplary optical fiber amplifiers of the first embodiment.

FIGS. 16A, 16B and 16C are schematic diagrams respectively showing forward pumping type, backward pumping type, and bidirectional pumping type configurations of an optical fiber amplifier according to the fifth embodiment of the present invention.

FIG. 17 is a schematic diagram showing an exemplary configuration of an optical fiber amplifier according to the sixth embodiment of the present invention.

DETAILED DESCRIPTION OF THE INVENTION

First Embodiment

Referring now to FIG. 3A to FIG. 5, the first embodiment of an optical fiber amplifier according to the present invention will be described in detail.

Figure 1A:
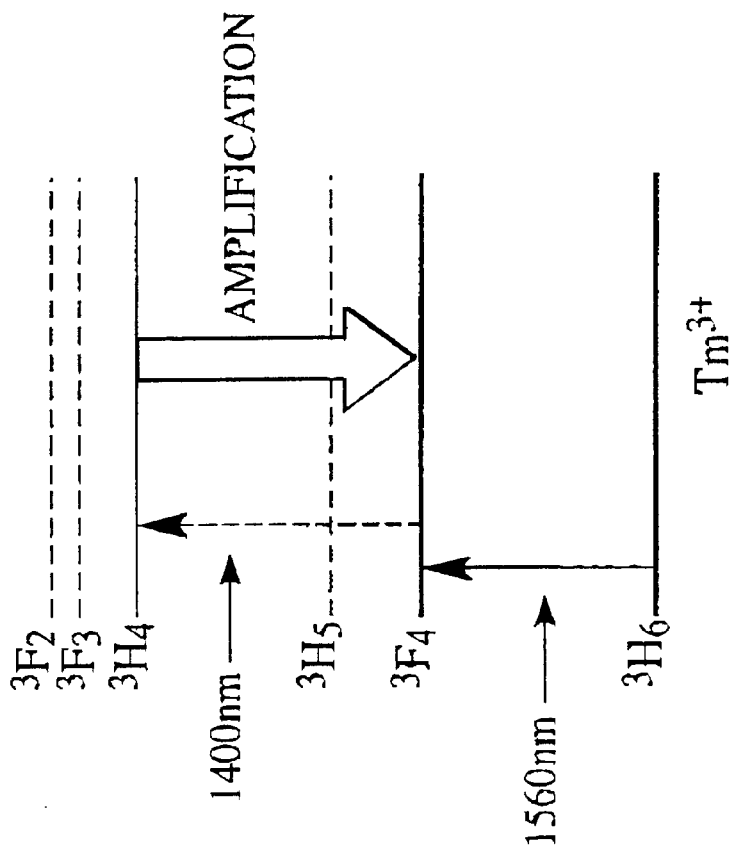
FIGS. 1A and 1B are energy level diagrams for explaining an operation principle of a conventional dual wavelength pumped TDFA (Thulium-Doped Fiber Amplifier)
Figure 1B:
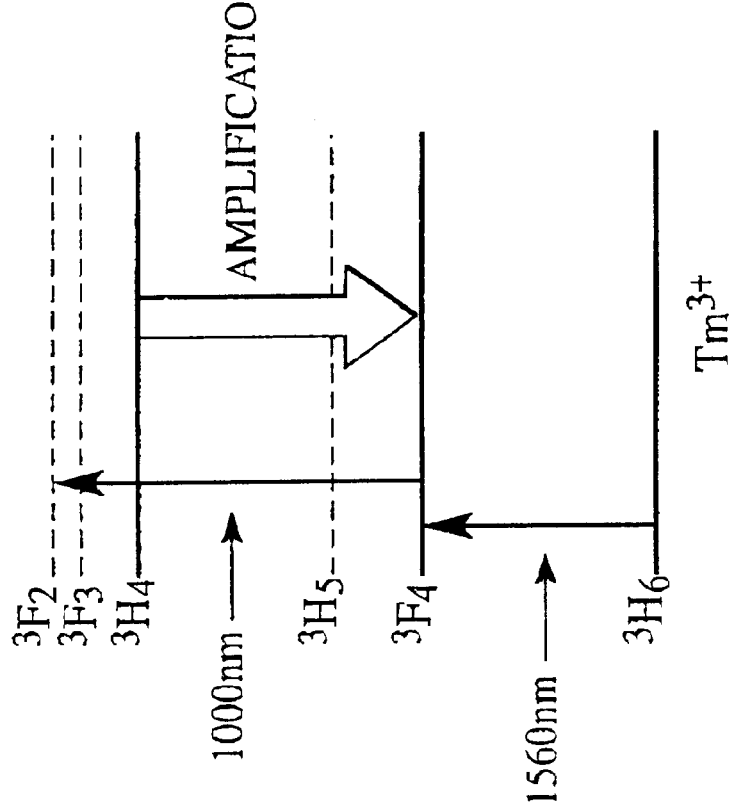
Figure 2:
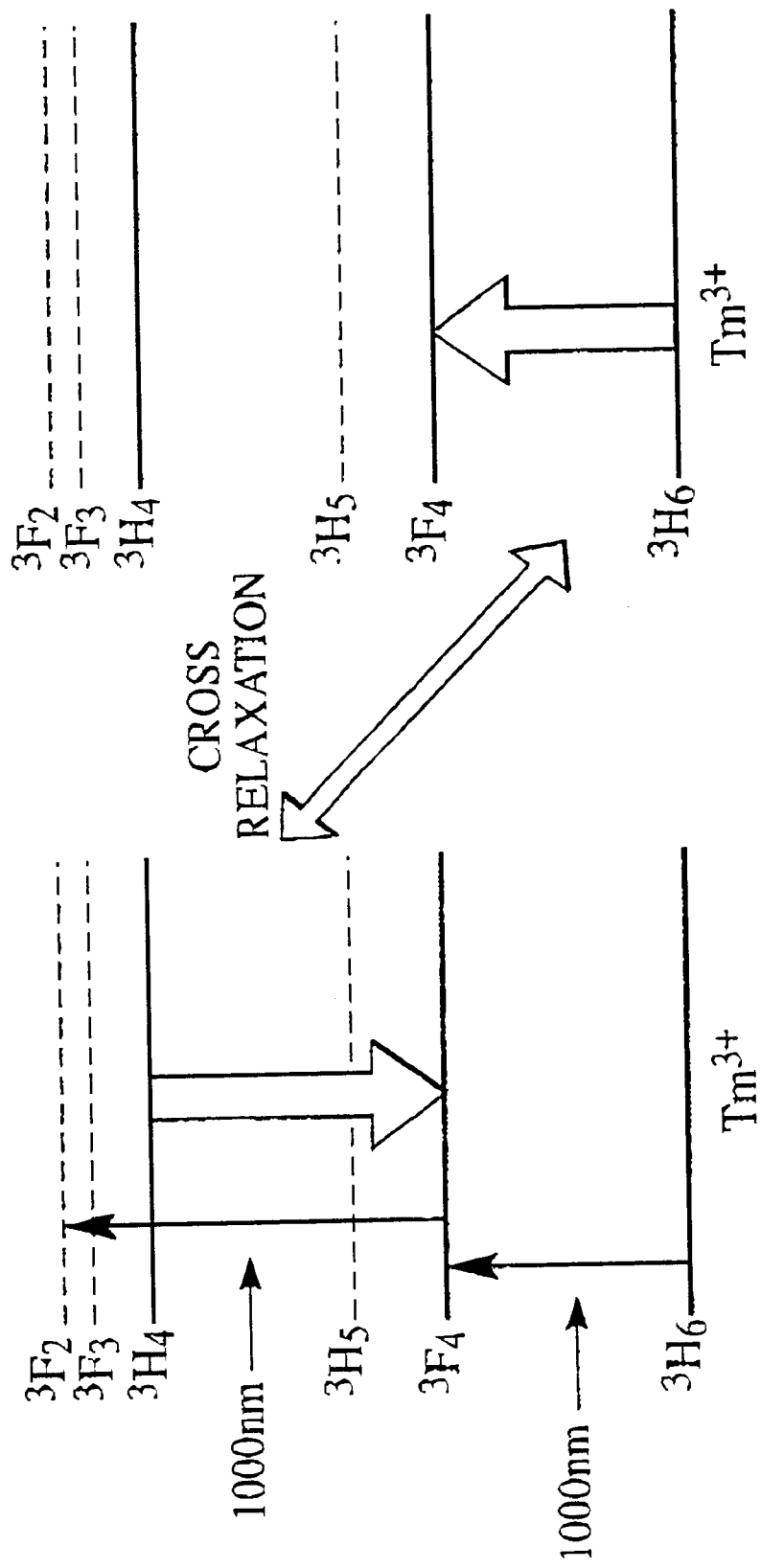
FIG. 2 is an energy level diagram for explaining an operation principle of a conventional high $Tm^{3+}$ concentration TDFA.
Figure 3A:
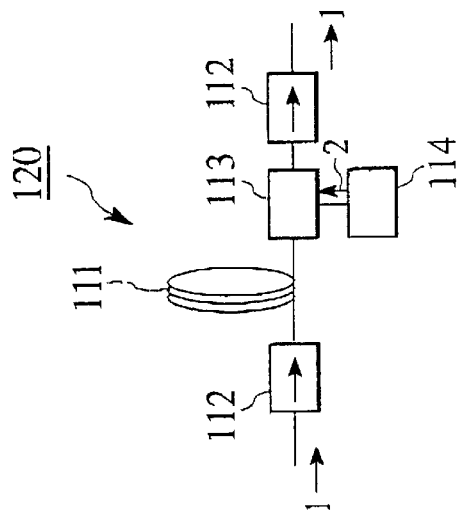
FIGS. 3A, 3B and 3C are schematic diagrams respectively showing forward pumping type, backward pumping type, and bidirectional pumping type configurations of an optical fiber amplifier according to the first embodiment of the present invention.
Figure 3B:
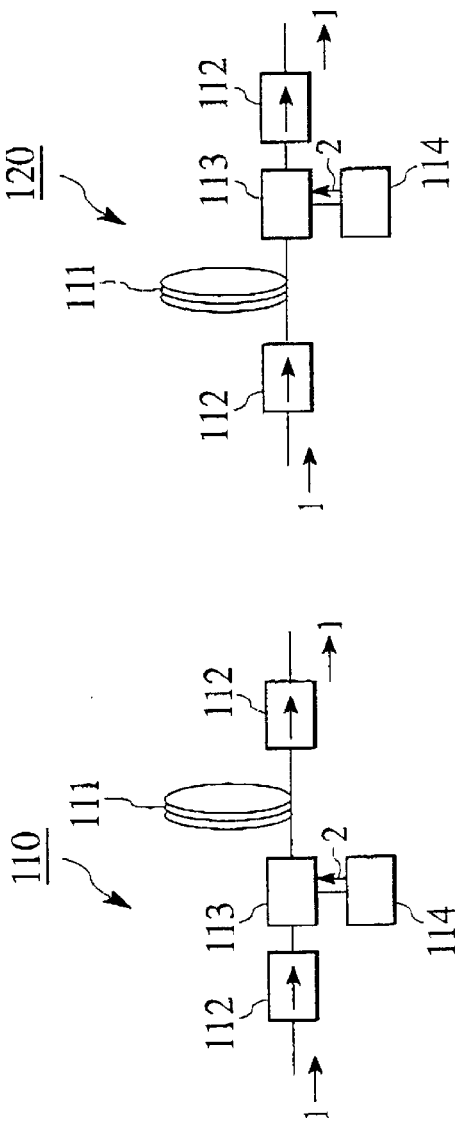
Figure 3C:
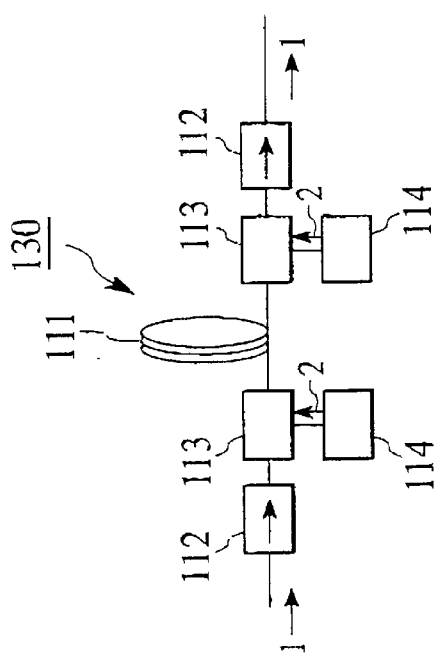

FIGS. 3A to 3C show schematic configurations of the optical fiber amplifier of the first embodiment.

FIG. 3A shows a schematic configuration of a forward pumping type optical fiber amplifier 110 in which a pump light 2 is entered along the same direction as a propagating direction of a signal light 1. As shown in FIG. 3A, this optical fiber amplifier 110 has a configuration in which optical isolators 112 are connected at both ends of an amplification optical fiber 111 that contains thulium (Tm) (preferably not less than 2000 ppmwt, more preferably not less than 3000 ppmwt) in its core, a wavelength division multiplexing type coupler 113 for multiplexing the signal light 1 and the pump light 2 is connected between the optical isolator 112 on the input side of the signal light 1 (1480–1520 nm)-and the amplification optical fiber 111, and a pump light source 114 for generating the pump light (1320–1480 nm) is connected to that coupler 113.

FIG. 3B shows a schematic configuration of a backward pumping type optical fiber amplifier 120 in which a pump light 2 is entered along the opposite direction of a propagating direction of the signal light 1. As shown in FIG. 3B, this optical fiber amplifier 120 has a configuration in which the coupler 113 and the pump light source 114 are connected between the optical isolator 112 on the output side of the signal light 1 and the amplification optical fiber 111, rather than between the optical isolator 112 on the input side of the signal light 1 and the amplification optical fiber 111.

FIG. 3C shows a schematic configuration of a bidirectional pumping type optical fiber amplifier 130 in which pump lights 2 are entered along both the same direction and the opposite direction of a propagating direction of the signal light 1. As shown in FIG. 3C, this optical fiber amplifier 130 has a configuration in which two couplers 113 are connected respectively between the optical isolator 112 on the input side of the signal light 1 and the amplification optical fiber 111 and between the optical isolator 112 on the output side of the signal light 1 and the amplification optical fiber 111, and two pump light sources 114 are connected respectively to these couplers 113.

In the amplification optical fiber 111, a host glass to which Tm is added can be a fluoride type glass (ZBLAN glass having $ZrF_4$, $BaF_2$, $LaF_3$ or the like as a main component, or In-Pb glass having $InF_2$, $BaF_2$, $PbF_3$ or the like as a main component, for example) in which the non-radiative transition is hard to occur, or a tellurite glass having $TeO_2$ or the like as a main component.

In this amplification optical fiber 111, Tm is contained at least in its core so that it is possible to cause the transition due to the stimulated emission of Tm ions and therefore it is possible to realize the amplification in the S-band.

Here, it is preferable for the amplification optical fiber 111 to contain Tm at least in its core at the concentration not less than 2000 ppmwt because then it becomes possible to realize a compact size by suppressing the length of the amplification optical fiber 111. In particular, it is more preferable for the amplification optical fiber 111 to contain Tm at least In its core at the concentration not less than 3000 ppmwt because then it becomes possible to reduce the fluorescent lifetime of amplification initial energy level to be not greater than 90% as the influence of the cross relaxation appears prominently. Note that the above described concentration should preferably be not greater than 10 wt % (or more preferably be not greater than 6 wt %) from a viewpoint of the currently available glass and fiber manufacturing techniques.

The coupler 113 can be a fused tapered type coupler, a dielectric multi-layer film type coupler, a circulator combined with a fiber grating, etc.

The pump light source 114 can be a fiber Raman laser, a laser diode (LD), etc.

In this embodiment, the coupler 113 and the pump light source 114 constitute a pump light input unit.

The conversion efficiencies obtained in the cases of pumping the signal light 1 (1480–1520 nm) by the pump light 2 (1320–1480 nm) using any one of ZBLAN glass (Zr type). In-Pb glass and the tellurite glass as the host glass, and using the amplification optical fiber 111 to which Tm is added at the concentration of either one of 2000 ppmwt and 3000 ppmwt (altogether six cases) in the optical fiber amplifier 110, 120 or 130 of the above described configuration are shown in FIG. 4. Here, the conversion efficiencies in the cases of using the conventional pump light (1047 nm) are also shown for the purpose of comparison.

As can be seen from FIG. 4, it is possible to improve the conversion efficiency for all types of the host glass for the amplification optical fiber 111. In particular, the conversion efficiency can be further improved in the case of the Tm concentration of 3000 ppmwt compared with the case of the Tm concentration or 2000 ppmwt.

Figure 5:
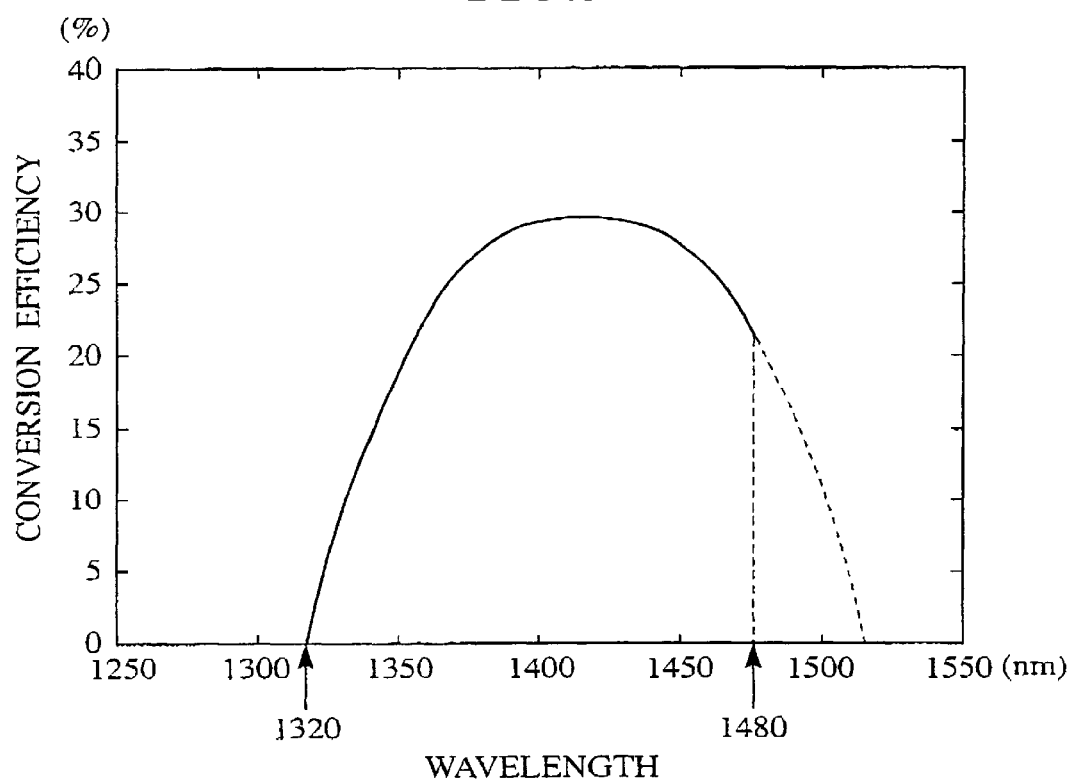
FIG. 5 is a graph showing a relationship between a wavelength of a pump light and a conversion efficiency in the optical fiber amplifier or the first embodiment.

Now, the relationship between the wavelength of the pump light 2 and the conversion efficiency is shown in FIG. 5. The conversion efficiency of the amplification optical fiber 111 that contains Tm at least in its core increases when the wavelength of the pump light 2 becomes greater than 1320 nm, becomes maximum in a vicinity of 1400 nm, and mostly disappears when the wavelength of the pump light 2 exceeds 1520 nm. For this reason, the wavelength of the pump light 2 should preferably be 1320–1520 nm, but in order to set the amplification bandwidth to the S-band (1480–1520 nm), it is preferably be in a range of 1320–1480 nm, or more preferably in a range of 1370–1460 nm because the conversion efficiency can be made sufficiently high (over 20% for 2000 ppmwt, over 25% for 3000 ppmwt) in this case.

Thus, according to the first embodiment, the pump light 2 with the wavelength in the 1400 nm hand which is the same as that of the signal light 1 is used so that the conversion efficiency of the signal light 1 can be improved.

Second Embodiment

Referring now to FIG. 6A to FIG. 8, the second embodiment of an optical fiber amplifier according to the present invention will be described in detail. Here, those elements which are substantially similar to the corresponding elements in the first embodiment described above will be given the same reference numerals in the figures and their description will be omitted.

FIGS. 6A to 6C show schematic configurations of the optical fiber amplifier of the second embodiment.

Figure 7:
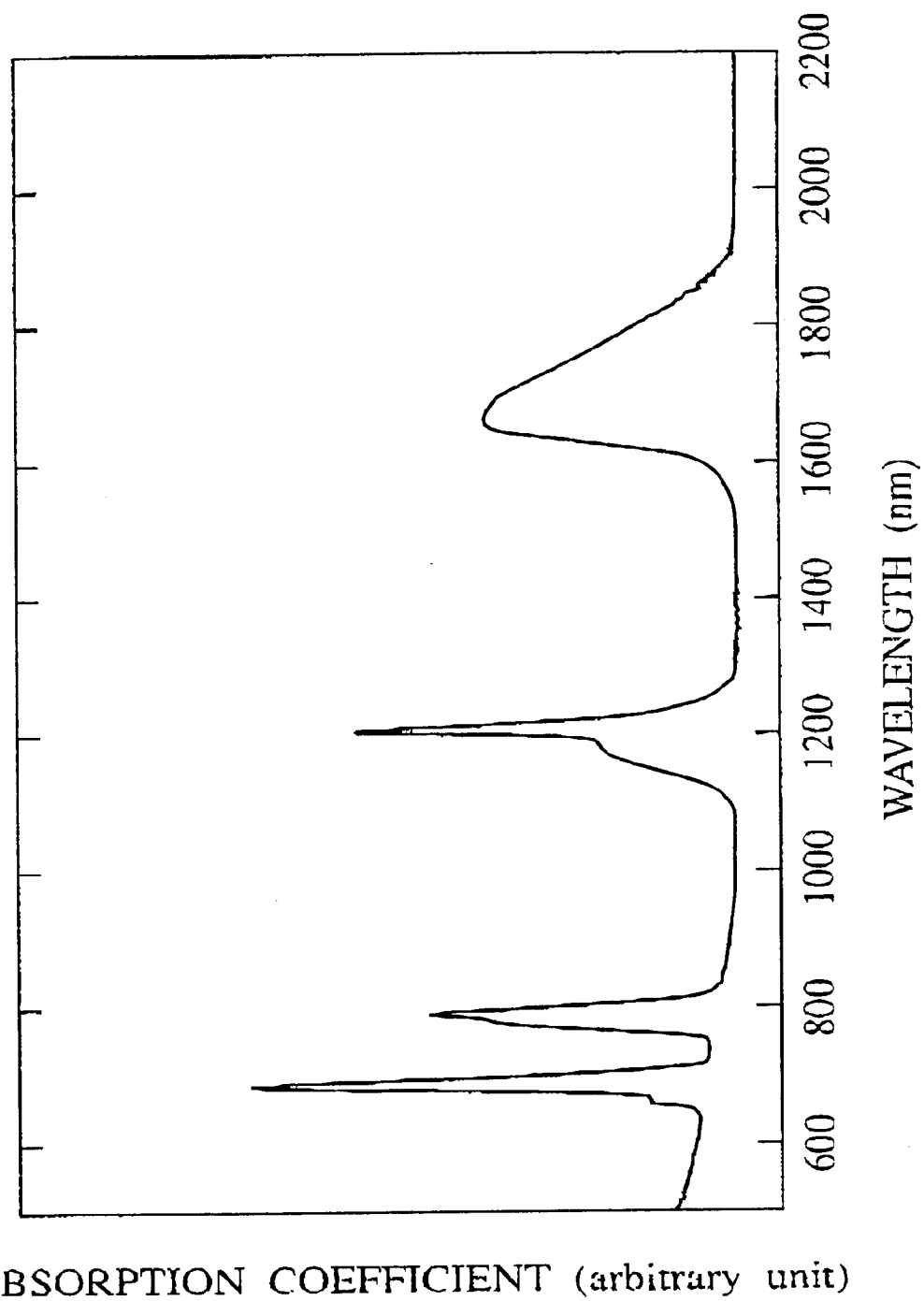
FIG. 7 is a graph showing an absorption spectrum of thulium utilized in the optical fiber amplifier of the second embodiment.

FIG. 6A shows a schematic configuration of a forward pumping type optical fiber amplifier 210 in which the pump light 2 and a auxiliary pumping light are entered along the same direction as the propagating direction of the signal light 1. As shown in FIG. 6A, this optical fiber amplifier 210 has a configuration in which the amplification optical finer 110 of the first embodiment described above is modified by connecting an auxiliary coupler 213 between the optical isolator 112 on the input side of the signal light 1 and the coupler 113, and connecting an auxiliary pump light source 214 for generating an auxiliary pump light 3 with the wavelength in a range of at least one of ranges 630–720 nm, 740–830 nm, 1100–1300 nm, and 1500–2000 nm to the auxiliary coupler 213. Here, the ranges 630–720 nm, 740–830 nm, 1100–1300 nm, and 1500–2000 nm are the high absorption ranges of Tm as shown in FIG. 7, Note that, in the forward pumping type optical fiber amplifier 210, the auxiliary coupler 213 and the auxiliary pump light source 214 are provided at a position A1 between the optical isolator 112 on the input side of the signal light 1 and the coupler 113 so that the auxiliary pump light 3 is entered along the same direction as the propagating direction of the signal light 1 as shown in FIG. 6A, but it is also possible to provide the auxiliary coupler 213 and the auxiliary pump light source 214 at a position A2 between the coupler 113 and the amplification optical fiber 111 so that the auxiliary pump light 3 is entered along the same direction as the propagating direction of the signal light 1, or provide the auxiliary coupler 213 and the auxiliary pump light source 214 at a position B between the amplification optical fiber 111 and the optical isolator 112 on the output side of the signal light 1 so that the auxiliary pump light 3 is entered along the opposite direction of the propagating direction of the signal light 1, or enter the auxiliary pump light 3 by combining any of these configurations.

FIG. 6B shows a schematic configuration of a backward pumping type optical fiber amplifier 220 in which the pump light 2 and the auxiliary pump light 3 are entered along the opposite direction of the propagating direction of the signal light 1. As shown in FIG. 6B, this optical fiber amplifier 220 has a configuration in which the optical fiber amplifier 120 of the first embodiment described above is modified by connecting the auxiliary coupler 213 at a position 82 between the optical isolator 112 on the output side of the signal light 1 and the coupler 113, and connecting the auxiliary pump light source 214 to the auxiliary coupler 213.

Note that, in the backward pumping type optical fiber amplifier 220, the auxiliary coupler 213 and the auxiliary pump light source 214 are provided at a position B2 between the optical isolator 112 on the output side of the signal light 1 and the coupler 113 so that the auxiliary pump light 3 is entered along the opposite direction of the propagating direction of the signal light 1 as shown in FIG. 6B, but it Is also possible to provide the auxiliary coupler 213 and the auxiliary pump light source 214 at a position B1 between the amplification optical fiber 111 and the coupler 113 so that the auxiliary pump light 3 is entered along the opposite direction of the propagating direction of the signal light 1, or provide the auxiliary coupler 213 and the auxiliary pump light source 214 at a position A between the optical isolator 112 on the input side of the signal light 1 and the amplification optical fiber 111 so that the auxiliary pump light 3 is entered along the same direction as the propagating direction of the signal light 1, or enter the auxiliary pump light 3 by combining any of these configurations.

FIG. 6C shows a schematic configuration of a bidirectional pumping type optical fiber amplifier 230 in which the pulp lights 2 and the auxiliary pump lights 3 are entered along both the same direction and the opposite direction of the propagating direction of the signal light 1. As shown In FIG. 6C, this optical fiber amplifier 230 has a configuration in which the amplification optical fiber 130 of the first embodiment described above is modified by connecting the auxiliary couplers 213 respectively at a position A2 between the optical isolator 112 on the input side of the signal light 1 and the amplification optical fiber 111 and at a position B1 between the amplification optical fiber 111 and the optical isolator 112 on the output side of the signal light 1, and connecting the auxiliary pump light sources 214 respectively to the auxiliary couplers 213.

Note that, in the bidirectional pumping type optical fiber amplifier 230, the auxiliary couplers 213 and the auxiliary pump light sources 214 are provided at a position A2 between the optical isolator 112 on the input side of the signal light 1 and the amplification optical fiber 111 and at a position B1 between the amplification optical fiber 111 and the optical isolator 112 on the output side of the signal light 1 so that the auxiliary pump lights 3 are entered along both the same direction and the opposite direction of the propagating direction of the signal light 1 as shown in FIG. 6C, but it is also possible to enter the auxiliary pump light 3 by providing the auxiliary coupler 213 and the auxiliary pump light source 214 at at least one of the above described positions A1, A2, B1 and B2.

In this embodiment, the coupler 213 and the pump light source 214 constitute an auxiliary pump Light input unit.

The conversion efficiencies obtained in the cases of pumping the signal light 1 by two wavelengths of the pump light 2 and the auxiliary pump light 3 using any one of ZBLAN glass (Zr type), In-Pb glass and the tellurite glass as the host glass, and using the amplification optical fiber 111 to which Tm is added at the concentration of either one of 2000 ppmwt and 3000 ppmwt (altogether six cases) in the optical fiber amplifier 210, 220 or 230 of the above described configuration are shown in FIG. 8. Here, the wavelength of the auxiliary pump light is set to be any one of 650 nm, 800 nm, 1200 nm, and 1560 nm. Also, the conversion efficiencies in the cases of the first embodiment described above (cases of using one wavelength of the pump light 2 alone) are also shown for the purpose of comparison.

As Can be seen from FIG. 8, it is possible to improve the conversion efficiency in the S-band for all types of the host glass for the amplification optical fiber 111, in the case of using two wavelengths of the pump light 2 and the auxiliary pump light 3 compared with the case of using one wavelength of the pump light 2 alone. In particular, the conversion efficiency in the S-band can be further improved in the case of the Tm concentration of 3000 ppmwt compared with the case of the Tm concentration of 2000 ppmwt.

Thus, according to the second embodiment, the auxiliary pump light 3 with the wavelength for which the ground level absorption is greater is entered in addition to the pump light 2 with the wavelength in the 1400 nm band so that the conversion efficiency of the signal light 1 can be improved even more than the case of the first embodiment described above.

Third Embodiment

Referring now to FIG. 9A to FIG. 13F, the third embodiment of an optical fiber amplifier according to the present invention will be described in detail. Here, those elements which are substantially similar to the corresponding elements in the first and second embodiments described above will be given the same reference numerals in the figures and their description will be omitted.

Figure 9A:
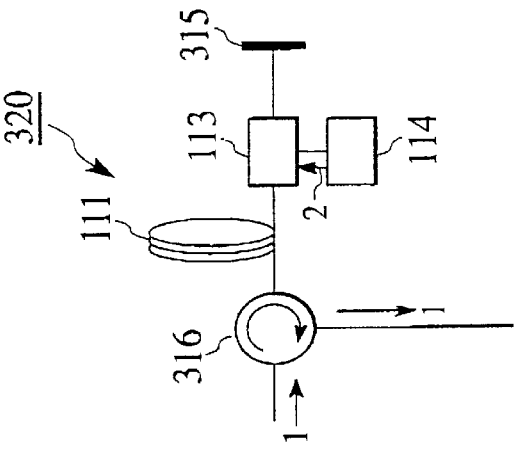
FIGS. 9A, 9B and 9C are schematic diagrams respectively showing forward pumping type, backward pumping type, and bidirectional pumping type configurations of an optical fiber amplifier according to the third embodiment of the present invention.
Figure 9B:
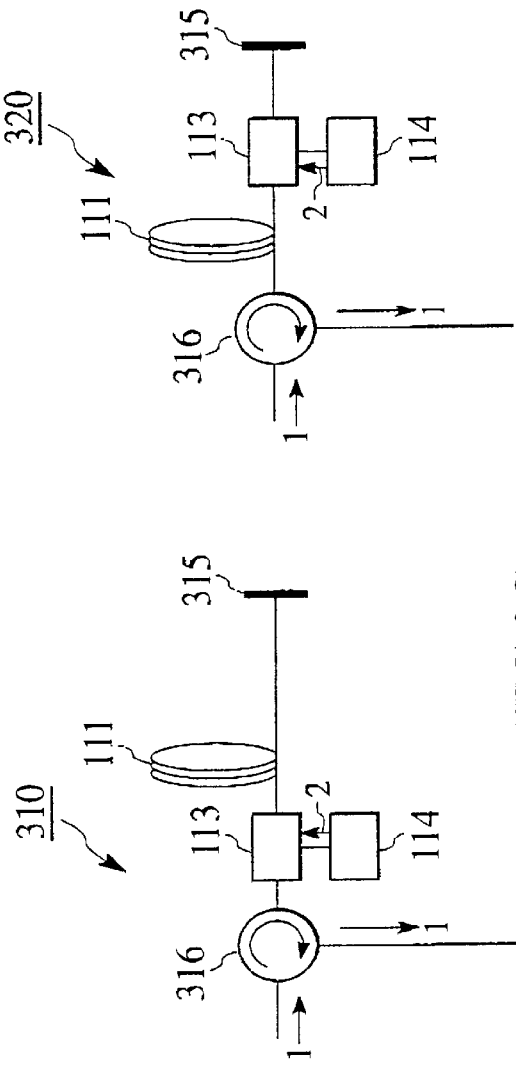
Figure 9C:
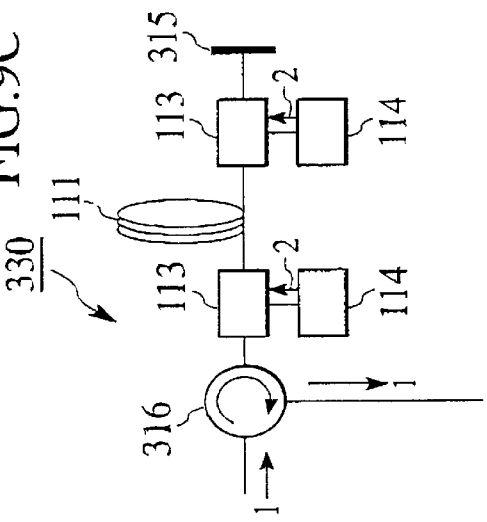

FIGS. 9A to 9C show schematic configurations of the optical fiber amplifier of the third embodiment.

FIG. 9A shows a schematic configuration of a forward pumping type optical fiber amplifier 310 in which the pump light 2 is entered along the same direction as the propagating direction of the signal light 1. As shown in FIG. 9A, this optical fiber amplifier 310 has a configuration in which the amplification optical fiber 110 of the first embodiment described above is modified by replacing the optical isolator 112 on the output side of the signal light 1 with a reflection mirror 315 for reflecting at least the signal light 1 among the signal light 1 and the pump light 2, and replacing the optical isolator 112 on the input side of the signal light 1 with an optical circulator 316 for separating an input signal light 1 and an output signal light 1.

FIG. 9B shows a schematic configuration of a backward pumping type optical fiber amplifier 320 in which the pump light 2 is entered along the opposite direction of the propagating direction of the signal light 1. As shown in FIG. 9B, this optical fiber amplifier 320 has a configuration In which the optical fiber amplifier 120 of the first embodiment described above is modified by replacing the optical isolator 112 on the output side of the signal light 1 with the reflection mirror 315, and replacing the optical isolator 112 on the input side of the signal light 1 with the optical circulator 316.

FIG. 9C shows a schematic configuration of a bidirectional pumping type optical fiber amplifier 330 in which the pump lights 2 are entered along both the same direction and the opposite direction of the propagating direction of the signal light 1. As shown in FIG. 9C, this optical fiber amplifier 330 has a configuration in which the amplification optical fiber 130 of the first embodiment described above is modified by replacing the optical isolator 112 on the output side of the signal light 1 with the reflection mirror 315, and replacing the optical isolator 112 on the input side of the signal light 1 with the optical circulator 316.

In this embodiment, the reflection mirror 315 constitutes a signal light turnaround propagation unit.

Figure 10:
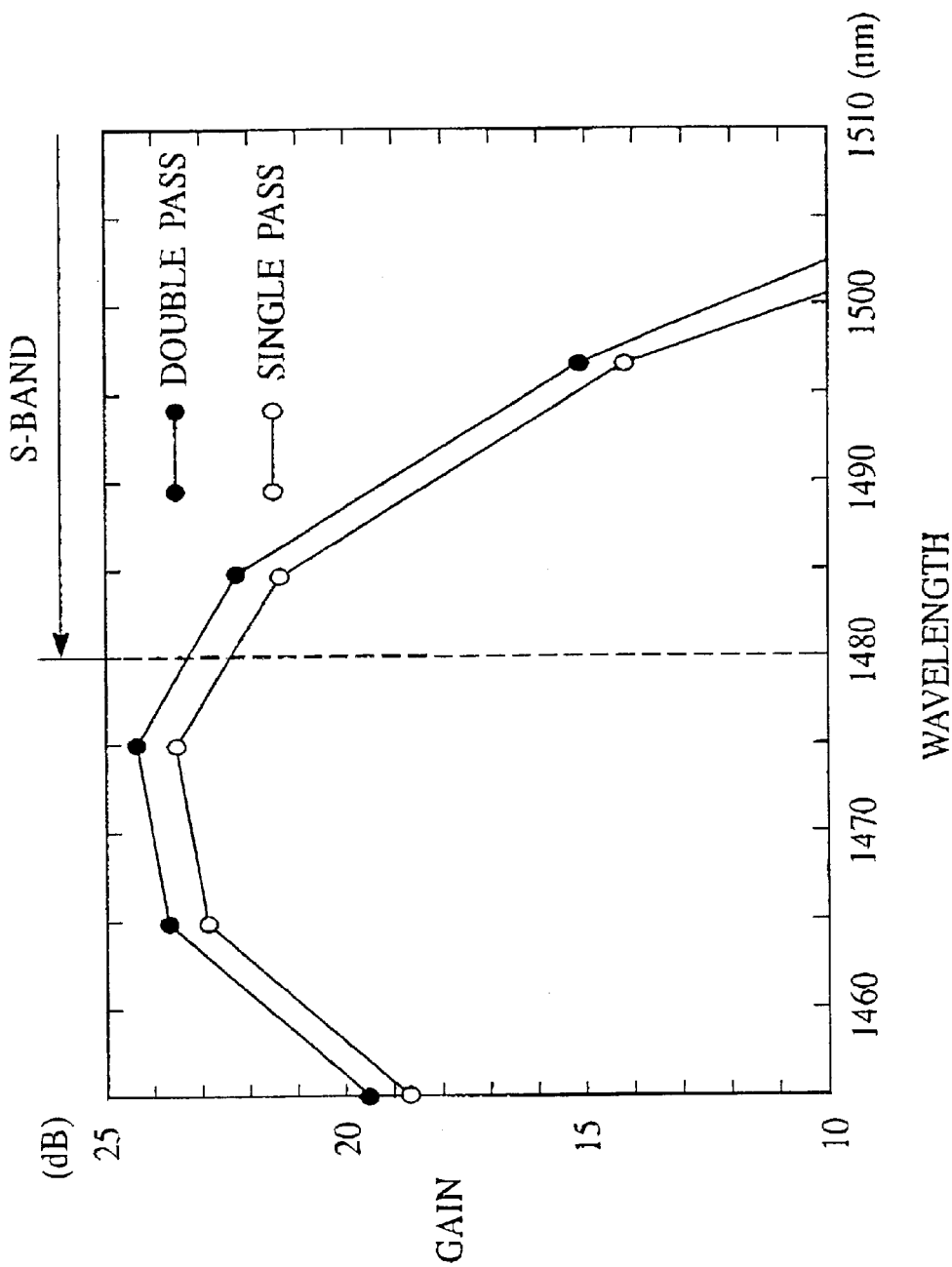
FIG. 10 is a graph showing gain spectra in the case of using an amplification optical fiber containing 2000 ppmwt of Tm, for the optical fiber amplifiers shown in FIG. 3C and FIG. 9C.
Figure 11:
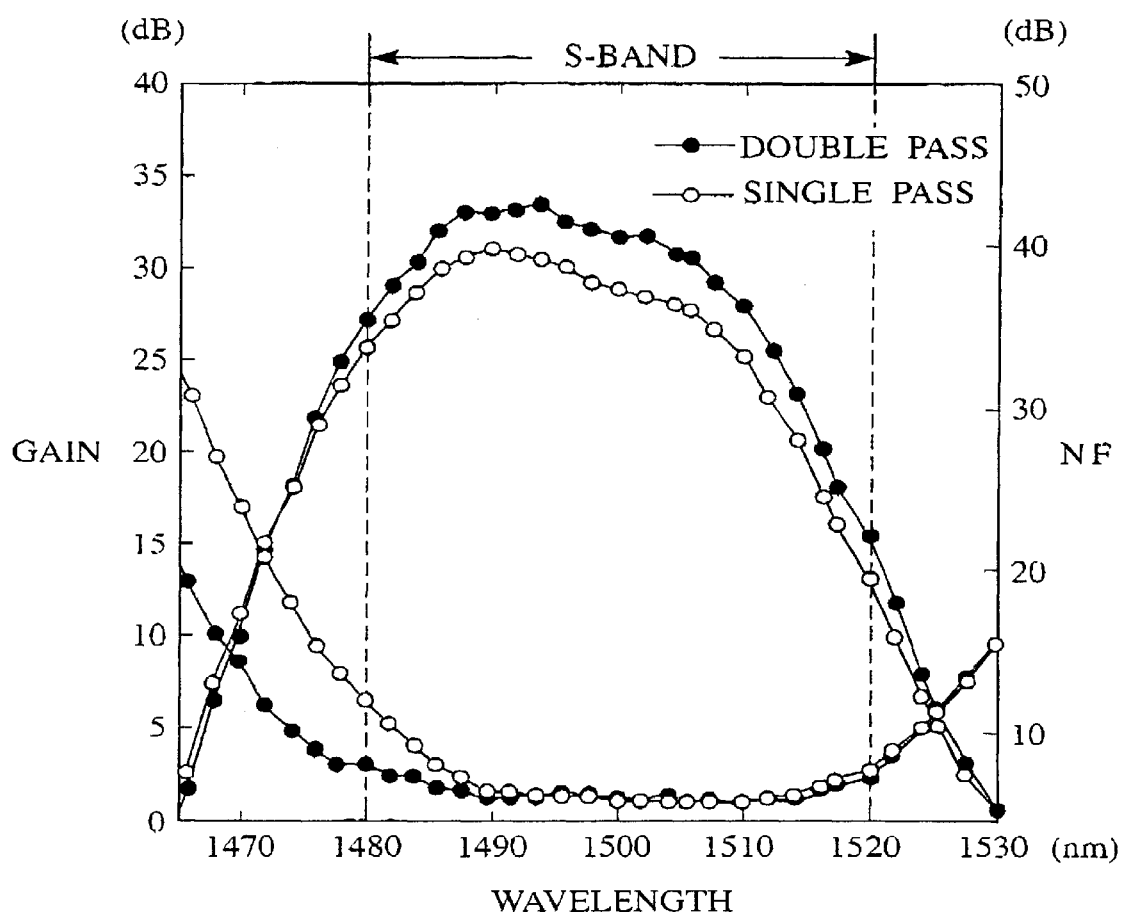
FIG. 11 is a graph showing gain spectra in the case of using an amplification optical fiber containing 6000 ppmwt of Tm, for the optical fiber amplifiers shown in FIG. 3C and FIG. 9C.

The gain spectra obtained in the cases of pumping the signal light 1 by the pump light 2 using the double pass type optical fiber amplifier 330 of the above described configuration in which the amplification optical fiber 111 has ZBLAN glass (Zr type) as the host glass and the Tm concentration of either one of 2000 ppmwt and 6000 ppmwt are shown in FIG. 10 (case of 2000 ppmwt) and FIG. 11 (case of 6000 ppmwt). Here, the input power of the signal light 1 is −13 dbm/ch(×4ch), the wavelength of the pump light 2 from one pump light source 114 is 1400 nm, the wavelength of the pump light 2 from another pump light source 114 is 1415 nm, the total output power of the pump light sources 114 is 500 mW, and the Length of the amplification optical fiber 111 is optimized such that a high gain can be obtained in the S-band. Also, the gain spectra in the cases of FIG. 3C of the first embodiment described above (single pass type using the length of the amplification optical fiber 111 is 16 m) are also shown for the purpose of comparison.

As can be seen from FIG. 10 and FIG. 11, it is possible to improve the gain In the S-band (1480–1520 nm) by the third embodiment (double pass type) compared with the first embodiment (single pass type) described above. In particular, the gain in the S-band can be further improved and the flatness of the gain can be improved in the case of the Tm concentration of over 3000 ppmwt (6000 ppmwt in this example) compared with the case of the Tm concentration of 2000 ppmwt.

Figure 12:
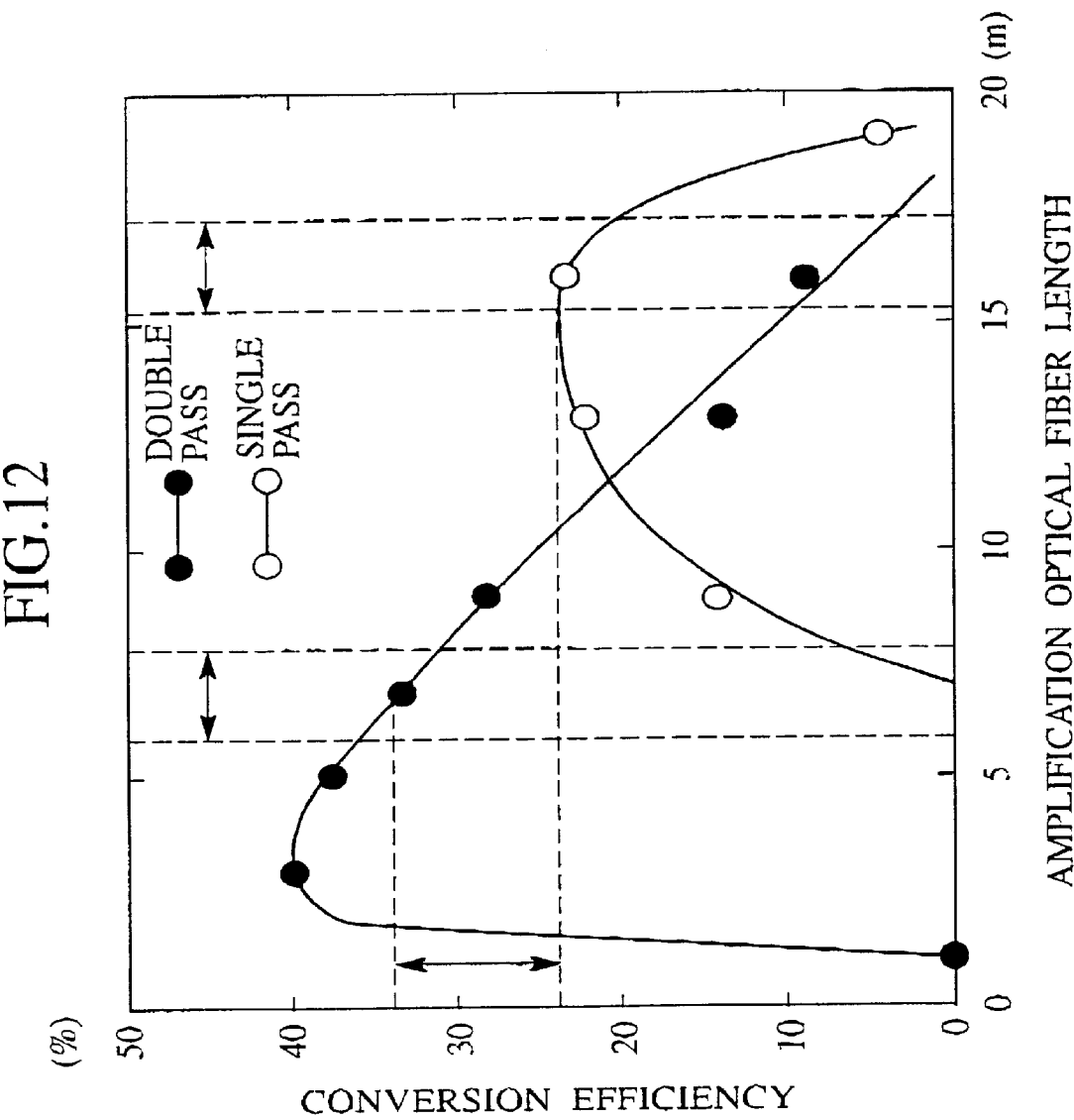
FIG. 12 is a graph showing a relationship between a length of an amplification optical fiber and a conversion efficiency in the optical fiber amplifier of the third embodiment.

Also, the relationships between the length of the amplification optical fiber 111 (Tm concentration: 6000 ppmwt) and the conversion efficiency in the S-band in the cases of the first embodiment (single pass type) described above and the third embodiment (double pass type) are shown in FIG. 12. Note that the conditions on the signal light 1 are the same in both cases.

As shown in FIG. 12, the single pass type can obtain a characteristic in which the gains at the 1480 nm and 1510 nm approximately coincide when the fiber length is 15.5 to 17 m, whereas the double pass type can obtain a characteristic in which the gains at the 1480 nm and 1510 nm approximately coincide when the fiber length is 6 to 8 m. The conversion efficiency of this fiber length for which the gains approximately coincide is about 24% for the single pass type and about 35% for the double pass type.

In the configurations of FIGS. 9A to 9C of the third embodiment, the reflection mirror 315 can be provided in various forms such as those shown in FIGS. 13A to 13F.

Figure 13A:
FIGS. 13A, 13B, 13C, 13D, 13E and 13F are schematic diagrams showing exemplary forms of a reflection mirror that can be used in the optical fiber amplifier of the third embodiment.
Figure 13B:
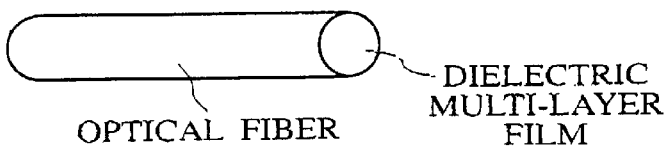
Figure 13C:
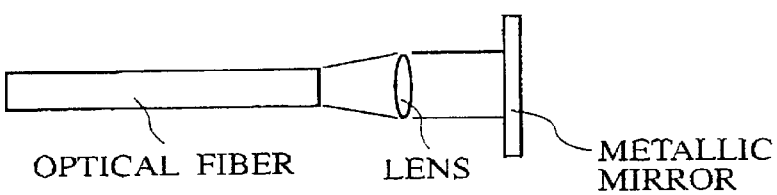
Figure 13D:
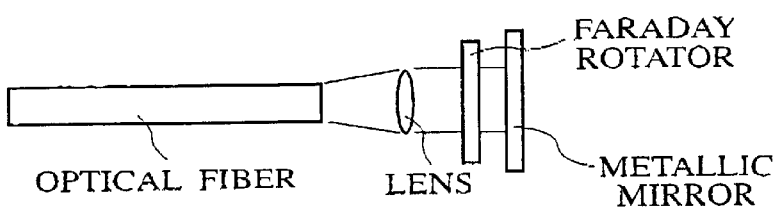
Figure 13E:
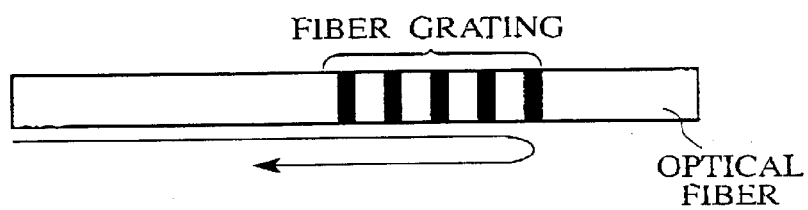
Figure 13F:
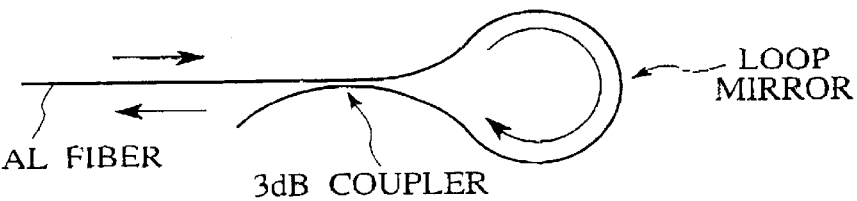

More specifically, FIG. 13A slows a reflection mirror realized by applying a gold vapor deposition to an end face of a vertically cut optical fiber. FIG. 13B shows a reflection mirror realized by attaching a dielectric multi-layer film at an end face of a vertically cut optical fiber. FIG. 13C shows a reflection mirror realized by a metallic mirror for reflecting lights emitted from a fiber end face back into the fiber. FIG. 13D shows a reflection mirror realized by inserting a Faraday rotator between the fiber end face and the metallic mirror in the reflection mirror of FIG. 13C. FIG. 13E shows a fiber grating type reflection mirror realized by providing periodic refractive index variations along a length direction of the optical fiber such that the entered lights will be reflected by the Bragg reflection. FIG. 13F shows a loop mirror type reflection mirror in which the lights are propagated through a looped polarization-preserving optical fiber and re-coupled by a 3 dB coupler.

Thus, according to the third embodiment, the conversion efficiency of the signal light 1 can be improved even more than the case of the first embodiment described above.

Fourth Embodiment

Figure 14B:
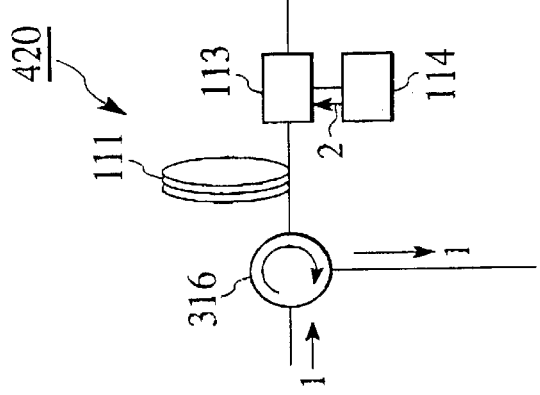
FIGS. 14A, 14B and 14C are schematic diagrams respectively showing forward pumping type, backward pumping type, and bidirectional pumping type configurations of an optical fiber amplifier according to the fourth embodiment of the present invention.
Figure 14A:
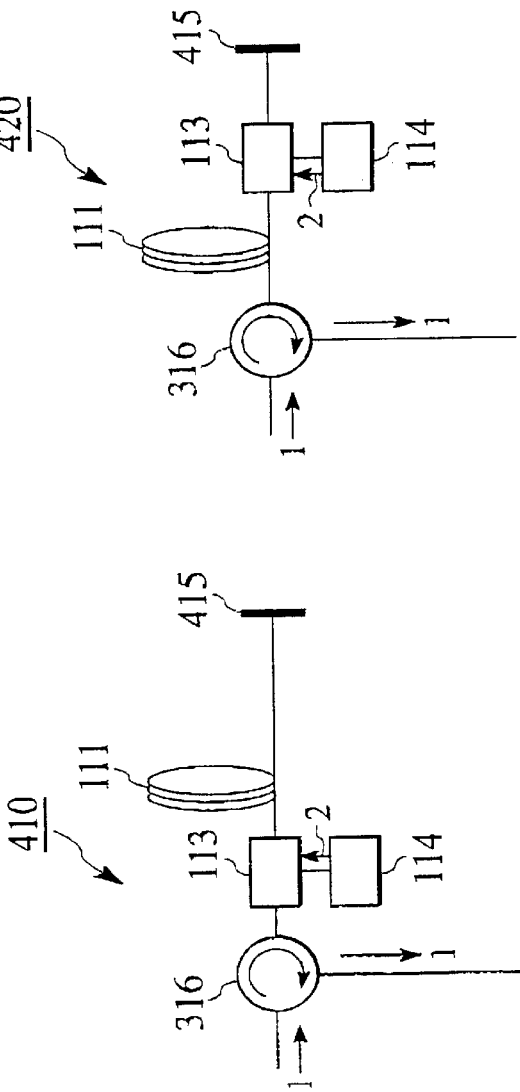
Figure 14C:
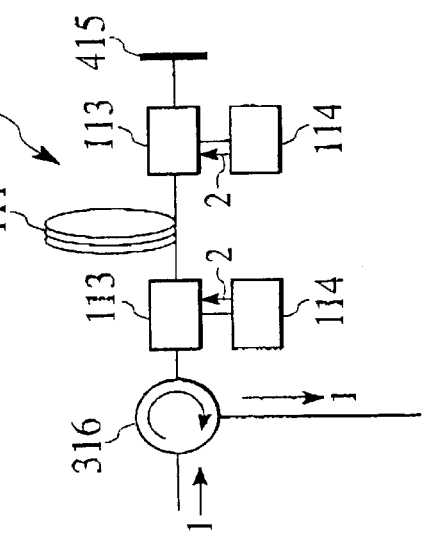
Figure 15:
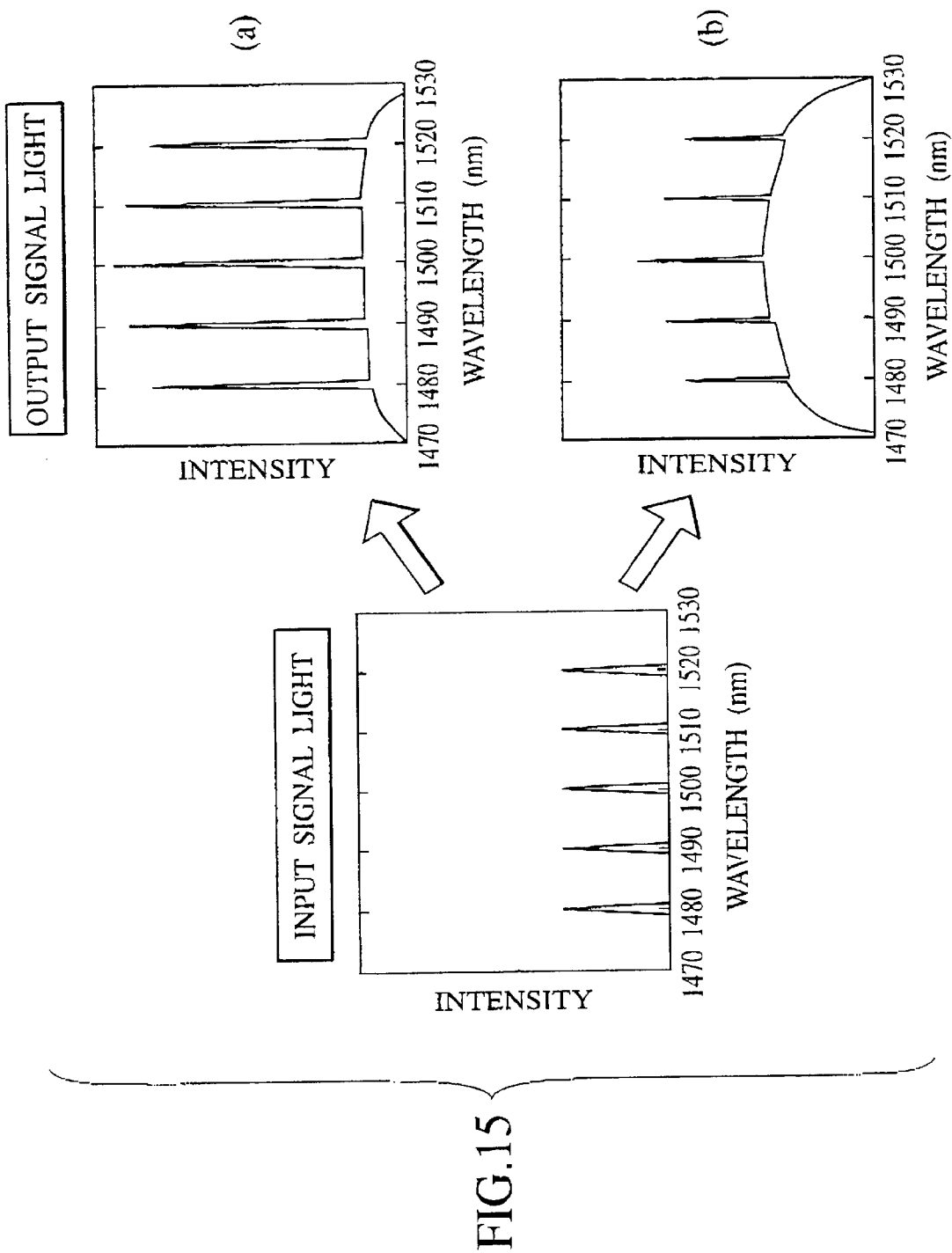
FIG. 15 is graphs showing signal light spectra in the optical fiber amplifier of the fourth embodiment and the optical fiber amplifier of the third embodiment.

Referring now to FIG. 14A to FIG. 15, the fourth embodiment of an optical fiber amplifier according to the present invention will be described in detail. Here, those elements which are substantially similar to the corresponding elements in the first to third embodiments described above will be given the same reference numerals in the figures and their description will be omitted.

FIGS. 14A to 14C show schematic configurations of the optical fiber amplifier of the fourth embodiment.

FIG. 14A shows a schematic configuration of a forward pumping type optical fiber amplifier 410 In which the pump light 2 is entered along the same direction as the propagating direction of the signal light 1. As shown in FIG. 14A, this optical fiber amplifier 410 has a configuration in which the amplification optical fiber 310 of the third embodiment described above is modified by replacing the reflection mirror 315 with a reflection mirror 415 through which ASE (Amplified Spontaneous Emission) lights pass.

FIG. 14B shows a schematic configuration of a backward pumping type optical fiber amplifier 420 in which the pump light 2 is entered along the opposite direction of the propagating direction of the signal light 1. As shown in FIG. 14B, this optical fiber amplifier 420 has a configuration in which the optical fiber amplifier 320 of the third embodiment described above is modified by replacing the reflection mirror 315 with the reflection mirror 415 through which ASE (Amplified Spontaneous Emission) lights can be transmitted.

FIG. 14C shows a schematic configuration of a bidirectional pumping type optical fiber amplifier 430 in which the pump lights 2 are entered along both the same direction and the opposite direction of the propagating direction of the signal light 1. As shown in FIG. 14C, this optical fiber amplifier 430 has a configuration in which the amplification optical fiber 330 of the third embodiment described above is modified by replacing the reflection mirror 315 with the reflection mirror 415 through which ASE (Amplified Spontaneous Emission) lights can be transmitted.

The reflection mirror 415 can be provided in various forms including a reflection mirror in which a metal vapor deposition is applied to a silica glass, a dielectric multi-layer film type reflection mirror, a fiber grating type reflection mirror, etc.

In this embodiment, the reflection mirror 415 constitutes a signal light turnaround propagation unit.

The signal light spectrum obtained in the case of pumping the signal light 1 by the pump light 2 using the optical fiber amplifier 410, 420 or 430 of the above described configuration is shown in a part (a) of FIG. 15. Also, the signal light spectrum in the case of using the optical fiber amplifier 310, 320, or 330 of the first embodiment described above (using the reflection mirror 315 for reflecting at least the signal light 1 among the signal light 1 and the pump light 2) is also shown for the purpose of comparison in a part (b) of FIG. 15.

As can be seen in FIG. 15, compared with the case of using the optical fiber amplifier 310, 320, or 330 of the third embodiment (a part (b) of FIG. 15), when the optical fiber amplifier 410, 420 or 430 of the fourth embodiment is used (a part (a) of FIG. 15), the signal-to-noise ratio becomes larger so that the noise characteristic is improved and the output intensity of the signal light 1 increases because the wasteful consumption of the pump light 2 by the ASF is reduced.

Thus, according to the fourth embodiment, the conversion efficiency of the signal light 1 can be improved even more than the case of the third embodiment described above.

Fifth Embodiment

Referring now to FIG. 16A to FIG. 16C, the fifth embodiment of an optical fiber amplifier according to the present invention will be described in detail. Here, those elements which are substantially similar to the corresponding elements in the first to fourth embodiments described above will be given the same reference numerals in the figures and their description will be omitted.

FIGS. 16A to 16C show schematic configurations of the optical fiber amplifier of the fifth embodiment.

FIG. 16A shows a schematic configuration of a forward pumping type optical fiber amplifier 510 in which the pump light 2 is entered along the same direction as the propagating direction of the signal light 1. As shown in FIG. 16A, this optical fiber amplifier 510 has a configuration in which the amplification optical fiber 210 of the second embodiment described above is modified by replacing the optical isolator 112 on the output side of the signal light 1 with the reflection mirror 315 used in the optical fiber amplifier 310 of the third embodiment described above, and replacing the optical isolator 112 on the input side of the signal light 1 with the optical circulator 316 used in the optical fiber amplifier 310 of the third embodiment described above.

FIG. 16B shows a schematic configuration of a backward pumping type optical fiber amplifier 520 in which the pump light 2 is entered along the opposite direction of the propagating direction of the signal light 1. As shown in FIG. 16B, this optical fiber amplifier 520 has a configuration in which the optical fiber amplifier 220 of the second embodiment described above is modified by replacing the optical isolator 112 on the output side of the signal light 1 with the reflection mirror 315, and replacing the optical isolator 112 on the input side of the signal light 1 with the optical circulator 316.

FIG. 16C shows a schematic configuration of a bidirectional pumping type optical fiber amplifier 530 in which the pump lights 2 are entered along both the same direction and the opposite direction of the propagating direction of the signal light 1. As shown in FIG. 16C, this optical fiber amplifier 530 has a configuration in which the amplification optical fiber 230 of the second embodiment described above Is modified by replacing the optical isolator 112 on the output side of the signal light 1 with the reflection mirror 315, and replacing the optical isolator 112 on the input side of the signal light 1 with the optical circulator 316.

In other words, the optical fiber amplifier 510, 520, or 530 of the fifth embodiment has a configuration that combines features of the optical fiber amplifier 210, 220, or 230 of the second embodiment described above and features of the optical fiber amplifier 310, 320, or 330 of the third embodiment described above.

Thus, according to the fifth embodiment, the effect of the second embodiment described above and the effect of the third embodiment described above can be obtained together so that the conversion efficiency of the signal light 1 can be improved further.

Sixth Embodiment

Referring now to FIG. 17, the sixth embodiment of an optical fiber amplifier according to the present invention will be described in detail. Here, those elements which are substantially similar to the corresponding elements in the first to fifth embodiments described above will be given the same reference numerals in the figures and their description will be omitted.

FIG. 17 shows a schematic configuration of the optical fiber amplifier of the sixth embodiment.

FIG. 17 shows a schematic configuration of a bidirectional pumping type optical fiber amplifier 630 in which the pump lights 2 are entered along both the same direction and the opposite direction of the propagating direction of the signal light 1. As shown in FIG. 17, this optical fiber amplifier 630 has a two stage configuration in which two of the amplification optical fiber 130 of the first embodiment described above are connected in series, that is, a plurality of the amplification optical fibers 111 are connected in series and the pump light sources 114 are connected to these amplification optical fibers 111 through the couplers 113. Note here that the optical isolator 112 on the output side of the optical fiber amplifier 130 of the first stage to which the signal light 1 is entered and the optical isolator 112 on the input side of the optical fiber amplifier 130 of the second stage from which the signal light 1 is outputted are provided by a single optical isolator 112.

In the optical fiber amplifier 630 of the above described configuration, the signal light 1 amplified by the optical fiber amplifier 130 of the first stage can be further amplified and outputted at the optical fiber amplifier 130 of the second stage.

Consequently, according to the sixth embodiment, it becomes possible to realize the signal light amplification with a higher gain and a higher output power than the case of the first embodiment described above.

Note that the sixth embodiment described above is directed to the case of using a configuration in which two bidirectional pumping type optical fiber amplifiers 130 are connected in series, but it is also possible to replace at least one of the optical fiber amplifiers of the first stage and the second stage with the forward pumping type optical fiber amplifier 110 or the backward pumping type optical fiber amplifier 120.

Seventh Embodiment

Figure 18:
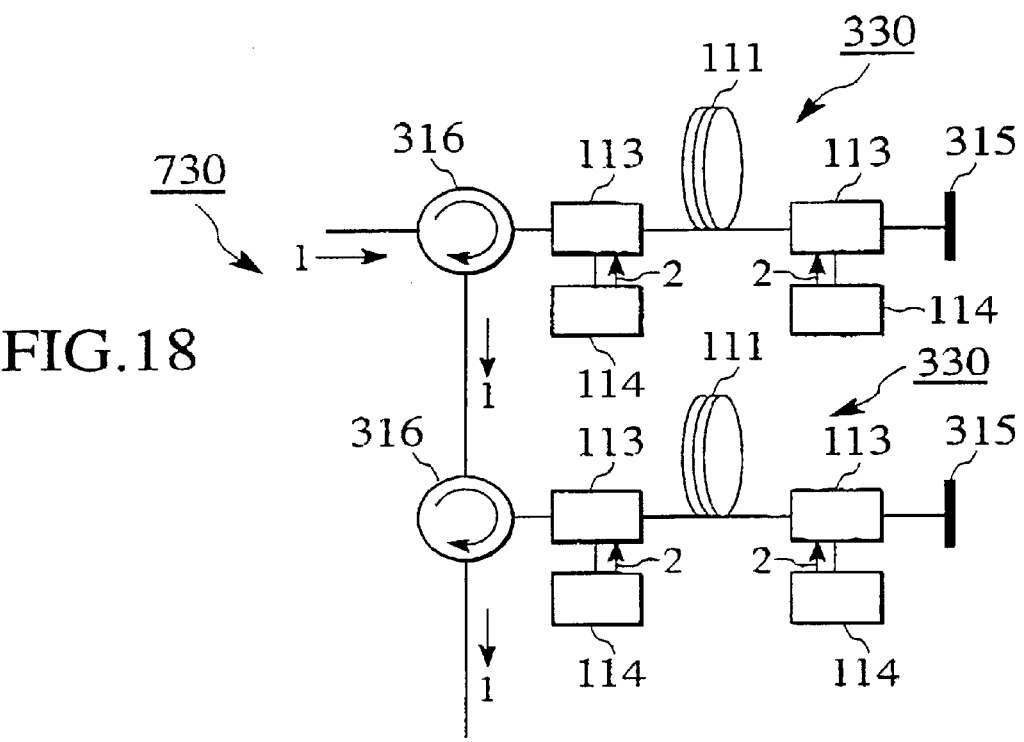
FIG. 18 is a schematic diagram showing an exemplary configuration of an optical fiber amplifier according to the seventh embodiment of the present invention.

Referring now to FIG. 18, the seventh embodiment of an optical fiber amplifier according to the present invention will be described in detail. Here, those elements which are substantially similar to the corresponding elements in the first to sixth embodiments described above will be given the same reference numerals in the figures and their description will be omitted.

FIG. 18 shows a schematic configuration of the optical fiber amplifier of the seventh embodiment.

FIG. 18 shows a schematic configuration of a bidirectional pumping type optical fiber amplifier 730 in which the pump lights 2 are entered along both the same direction and the opposite direction of the propagating direction of the signal light 1. As shown in FIG. 18, this optical fiber amplifier 730 has a two stage configuration in which two of the amplification optical fiber 330 of the third embodiment described above are connected in series, that is, a plurality of the amplification optical fibers 111 are connected in series and the pump light sources 114 are connected to these amplification optical fibers 111 through the couplers 113.

In the optical fiber amplifier 730 of the above described configuration, the signal light 1 amplified by the optical fiber amplifier 330 of the first stage can be further amplified and outputted at the optical fiber amplifier 330 of the second stage.

Consequently, according to the seventh embodiment, it becomes possible to realize the signal light amplification with a higher gain and a higher output power than the case of the third embodiment described above. In addition, by suppressing the signal light 1 outputted from the optical fiber amplifier 330 of the first stage within several dBm, the population inversion state at the front end portion of the amplification optical fiber 111 in the optical fiber amplifier 330 of the second stage can be made higher, so that it is possible to suppress the lowering of the noise figure.

Note that the seventh embodiment described above is directed to the case of using a configuration in which two bidirectional pumping type optical fiber amplifiers 330 are connected in series, but it Is also possible to replace at least one of the optical fiber amplifiers of the first stage and the second stage with the forward pumping type optical fiber amplifier 310 or the backward pumping type optical fiber amplifier 320.

Eighth Embodiment

Figure 19:
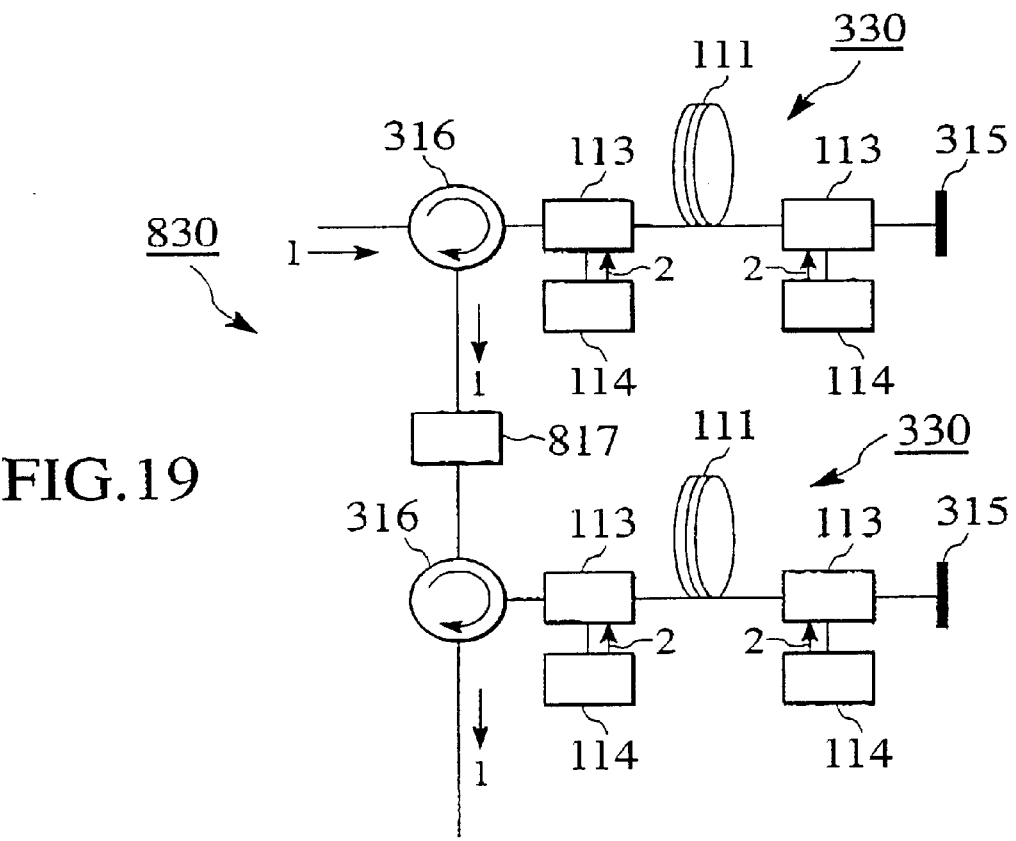
FIG. 19 is a schematic diagram showing an exemplary configuration of an optical fiber amplifier according to the eighth embodiment of the present invention.

Referring now to FIG. 19, the eighth embodiment of an optical fiber amplifier according to the present invention will be described in detail. Here, those elements which are substantially similar to the corresponding elements in the first to seventh embodiments described above will be given the same reference numerals in the figures and their description will be omitted.

FIG. 19 shows a schematic configuration of the optical fiber amplifier of the eighth embodiment.

FIG. 19 shows a schematic configuration of a bidirectional pumping type optical fiber amplifier 830 in which the pump lights 2 are entered along both the same direction and the opposite direction of the propagating direction of the signal light 1. As shown in FIG. 19, this optical fiber amplifier 830 has a configuration in which the amplification optical fiber 730 of the seventh embodiment described above is modified by connecting a gain equalizer 817 between the optical fiber amplifier 330 of the first stage and the optical fiber amplifier 330 of the second stage.

In the optical fiber amplifier 830 of the above described configuration, the signal light 1 amplified by the optical fiber amplifier 330 of the first stage will be equalized to have a flat gain characteristic by the gain equalizer 817 and then further amplified and outputted by the optical fiber amplifier 330 of the second stage.

Consequently, according to the eighth embodiment, it becomes possible to output the signal light 1 which is amplified by a more equalized gain characteristic in the 1480–1520 nm band than the case of the seventh embodiment described above.

Note that the eighth embodiment described above is directed to the case of using a configuration in which two bidirectional pumping type optical fiber amplifiers 330 are connected in series, but it is also possible to replace at least one of the optical fiber amplifiers of the first stage and the second stage with the forward pumping type optical fiber amplifier 310 or the backward pumping type optical fiber amplifier 320.

Note also that the eighth embodiment described above is directed to the case of using one gain equalizer 817, but it is also possible to use more than one gain equalizers 817.

Ninth Embodiment

Referring now to FIG. 20 to FIG. 27, the ninth embodiment of an optical fiber amplifier according to the present invention will be described in detail. Here, those elements which are substantially similar to the corresponding elements in the first to eighth embodiments described above will be given the same reference numerals in the figures and their description will be omitted.

FIGS. 20 to 27 show schematic configurations of the optical fiber amplifier of the ninth embodiment.

In the sixth to eighth embodiments described above, a plurality of the amplification optical fibers 111 are connected in series, and the pump light sources 114 are connected to these amplification optical fibers 111 through the to couplers 113. In contrast, in the ninth embodiment, a plurality of amplification optical fibers 111 are connected in parallel through optical splitter/combiner. In this way, it is also possible to realize the signal light amplification and the high output power.

Figure 20:
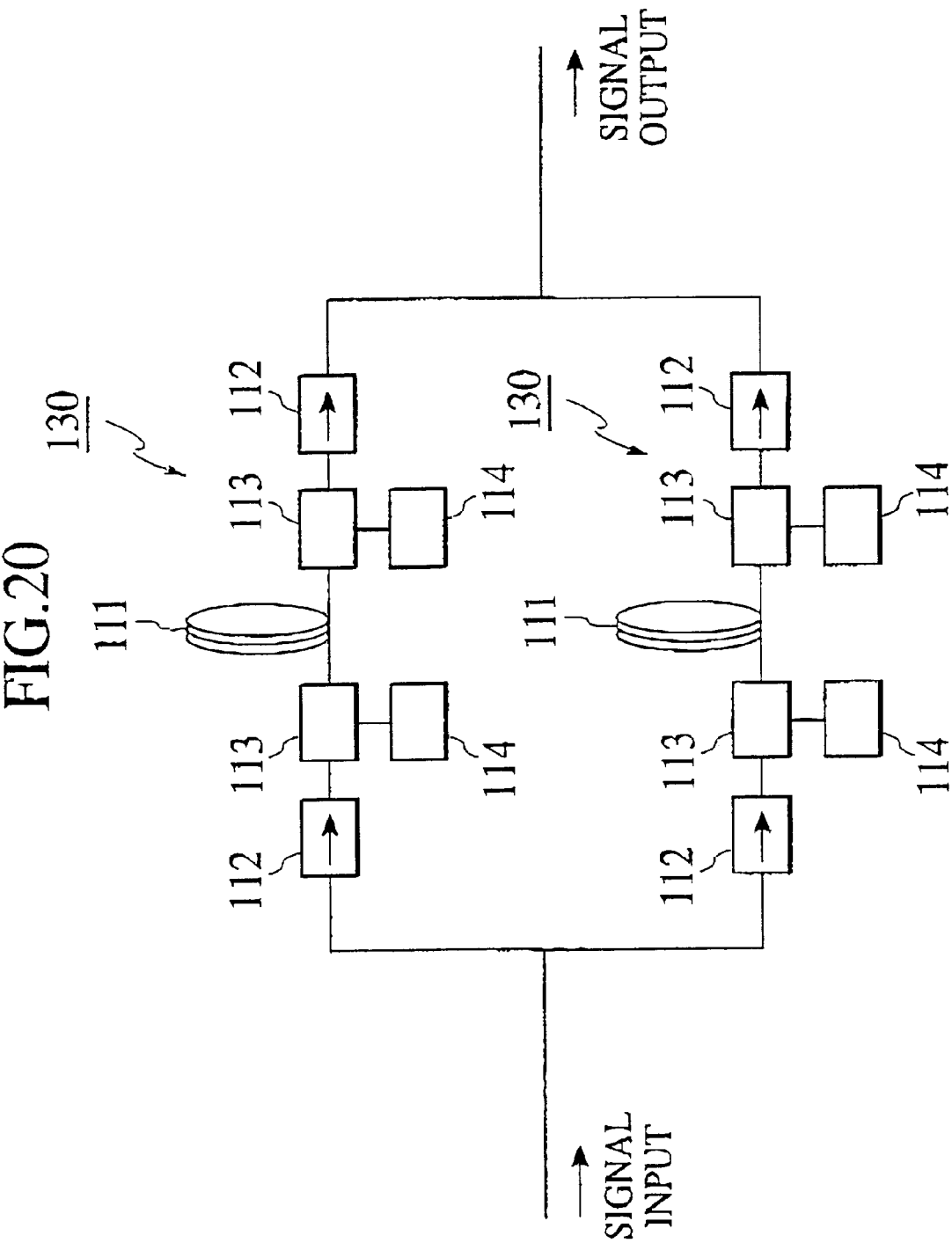
FIG. 20 is a schematic diagram showing one exemplary configuration of an optical fiber amplifier according to the ninth embodiment of the present invention.

More specifically, FIG. 20 shows schematic configuration of a bidirectional pumping type optical fiber amplifier in which the pump lights 2 are entered along both the same direction and the opposite direction of the propagating direction of the signal light 1, and which has a configuration in which two of the amplification optical fiber 130 of the first embodiment described above are connected in parallel.

Figure 21:
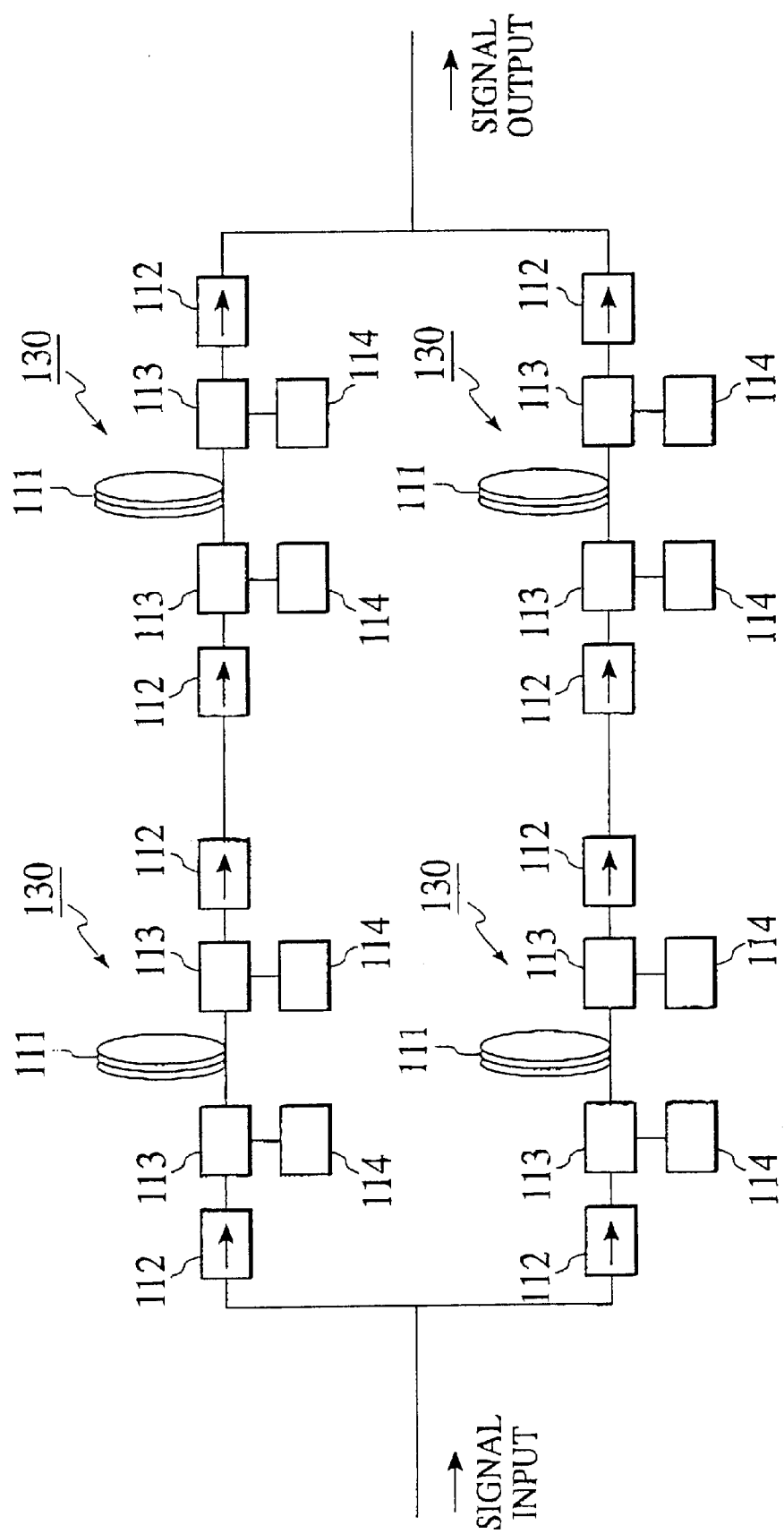
FIG. 21 is a schematic diagram showing another exemplary configuration of an optical fiber amplifier according to the ninth embodiment of the present invention.

Similarly, FIG. 21 shows a schematic configuration of a bidirectional pumping type optical fiber amplifier in which the pump lights 2 are entered along both the same direction and the opposite direction of the propagating direction of the signal light 1, and which has a configuration in which two sets of two amplification optical fibers 130 of the first embodiment described above that are connected in series are connected in parallel.

Figure 22:
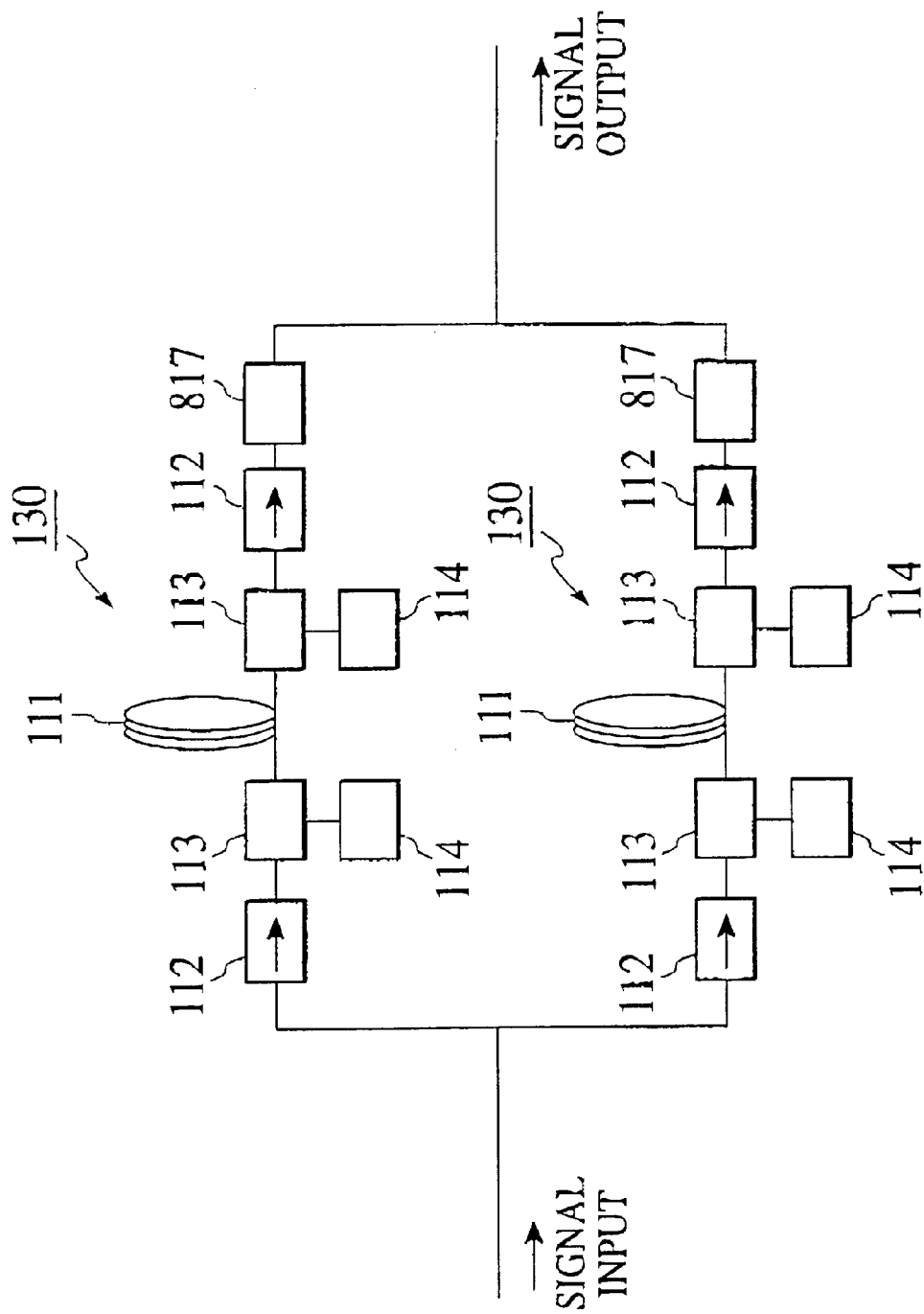
FIG. 22 is a schematic diagram showing another exemplary configuration of an optical fiber amplifier according to the ninth embodiment of the present invention.

Similarly, FIG. 22 shows a schematic configuration of a bidirectional pumping type optical fiber amplifier in which the pump lights 2 are entered along both the same direction and the opposite direction of the propagating direction of the signal light 1, and which has a configuration in which two of the amplification optical fiber 130 of the first embodiment described above are connected in parallel, and two gain equalizers 817 are added respectively at output side of these two amplification optical fibers 130.

Figure 23:
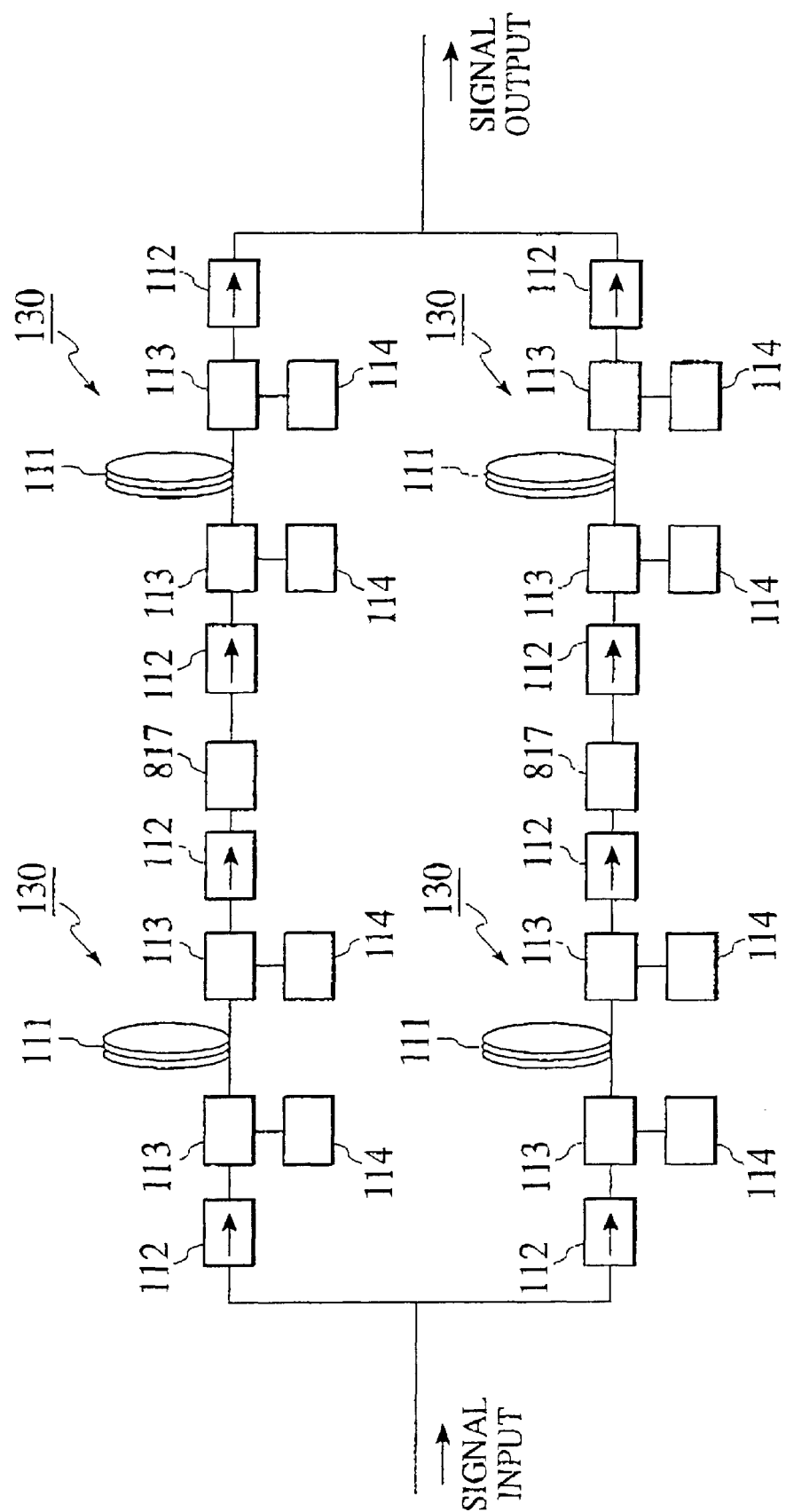
FIG. 23 is a schematic diagram showing another exemplary configuration of an optical fiber amplifier according to the ninth embodiment of the present invention.

Similarly, FIG. 23 shows a schematic configuration of a bidirectional pumping type optical fiber amplifier in which the pump lights 2 are entered along both the same direction and the opposite direction of the propagating direction of the signal light 1, and which has a configuration in which two sets of two amplification optical fibers 130 of the first embodiment described above that are connected in series are connected in parallel, and two gain equalizers 817 are added respectively between the optical fiber amplifier of the first stage and the optical fiber amplifier of the second stage in each of these two sets of two amplification optical fibers 130.

Figure 24:
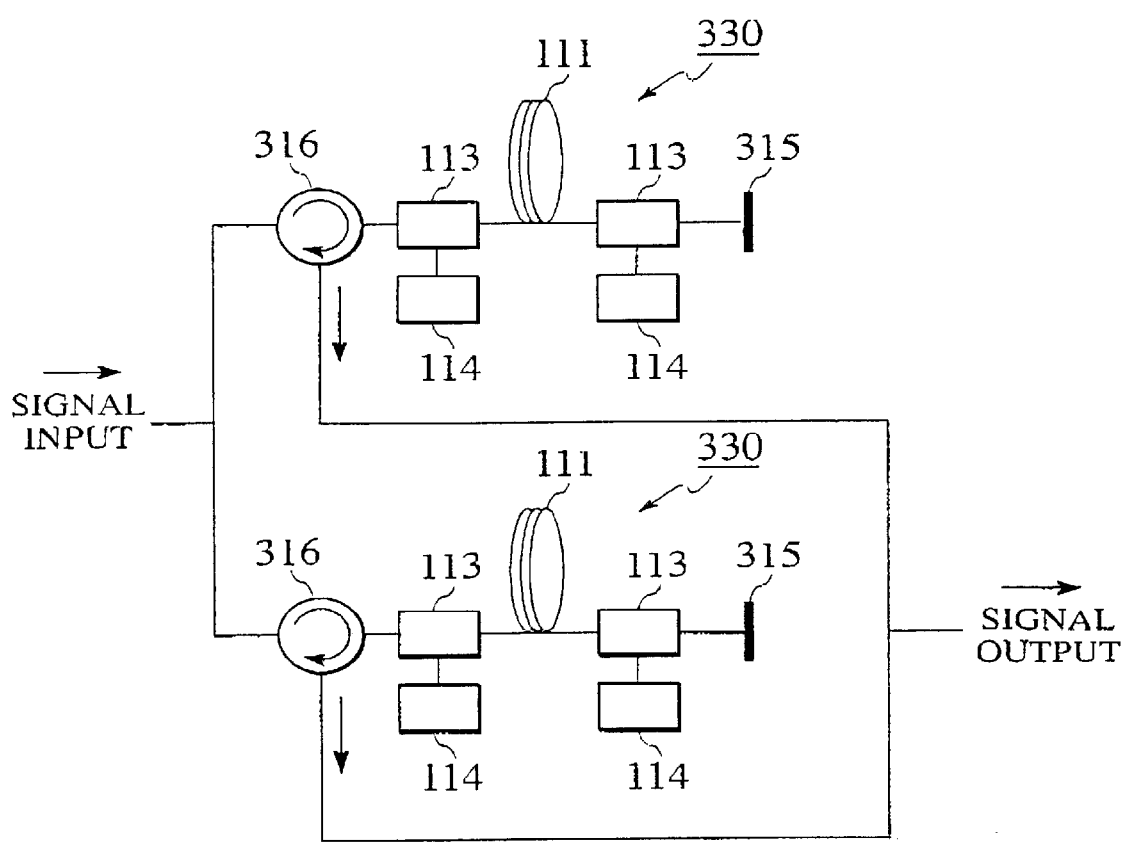
FIG. 24 is a schematic diagram showing another exemplary configuration of an optical fiber amplifier according to the ninth embodiment of the present invention.

Similarly, FIG. 24 shows a schematic configuration of a bidirectional pumping type optical fiber amplifier in which the pump lights 2 are entered along both the same direction and the opposite direction of the propagating direction of the signal light 1, and which has a configuration in which two of the amplification optical fiber 330 of the third embodiment described above are connected in parallel.

Figure 25:
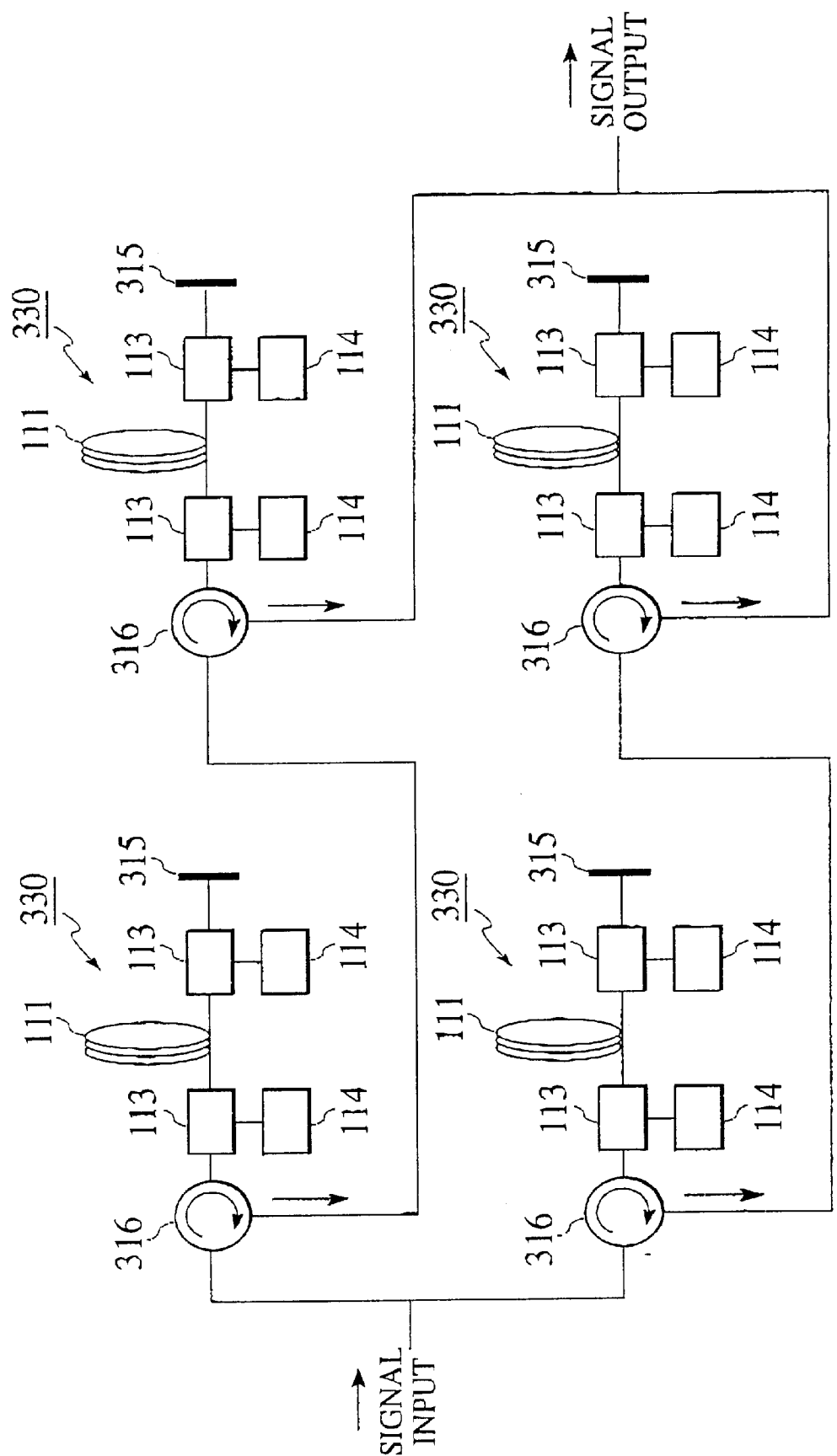
FIG. 25 is a schematic diagram showing another exemplary configuration of an optical fiber amplifier according to the ninth embodiment of the present invention.

Similarly, FIG. 25 shows a schematic configuration of a bidirectional pumping type optical fiber amplifier in which the pump lights 2 are entered along both the same direction and the opposite direction of the propagating direction of the signal light 1, and which has a configuration in which two sets of two amplification optical fibers 330 of the third embodiment described above that are connected in series are connected in parallel.

Figure 26:
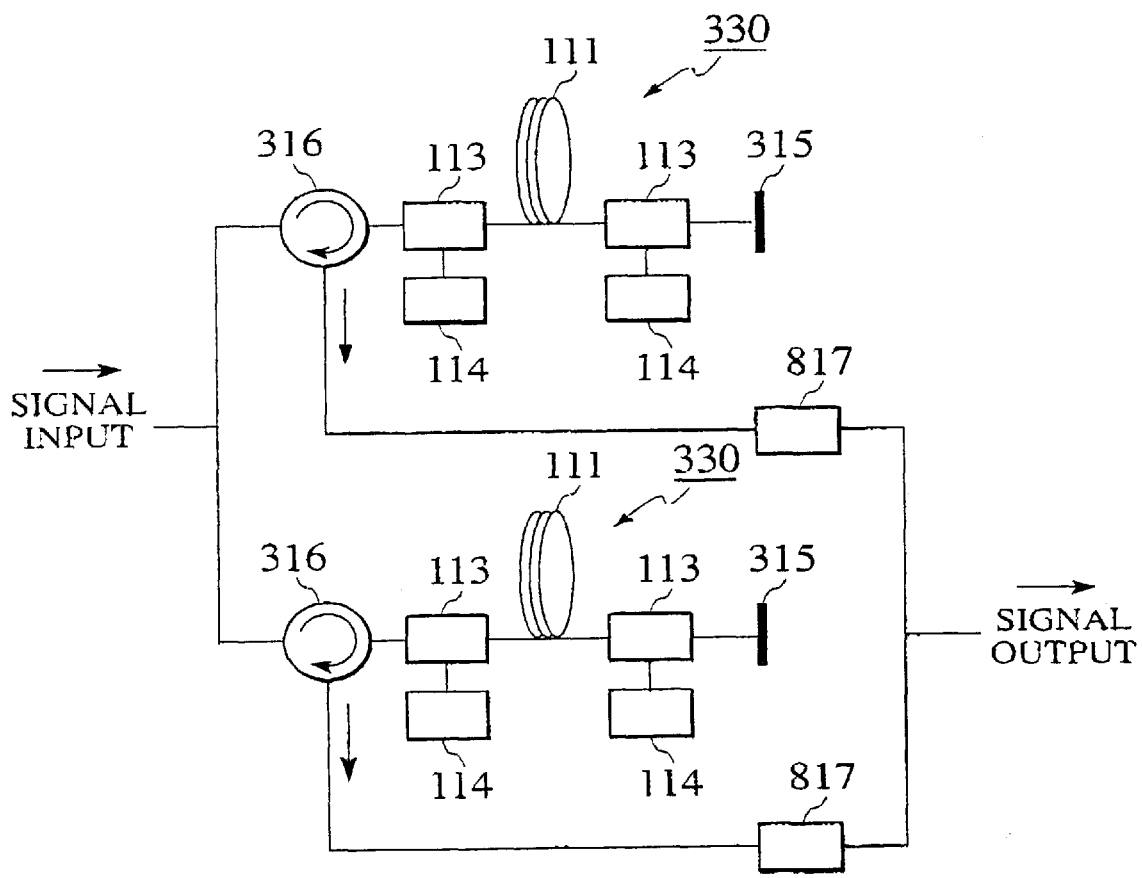
FIG. 26 is a schematic diagram showing another exemplary configuration of an optical fiber amplifier according to the ninth embodiment of the present invention.

Similarly, FIG. 26 shows a schematic configuration of a bidirectional pumping type optical fiber amplifier in which the pump lights 2 are entered along both the same direction and the opposite direction of the propagating direction of the signal light 1, and which has a configuration in which two of the amplification optical fiber 330 of the third embodiment described above are connected in parallel, and two gain equalizers 817 are added respectively at output side of these two amplification optical fibers 330.

Figure 27:
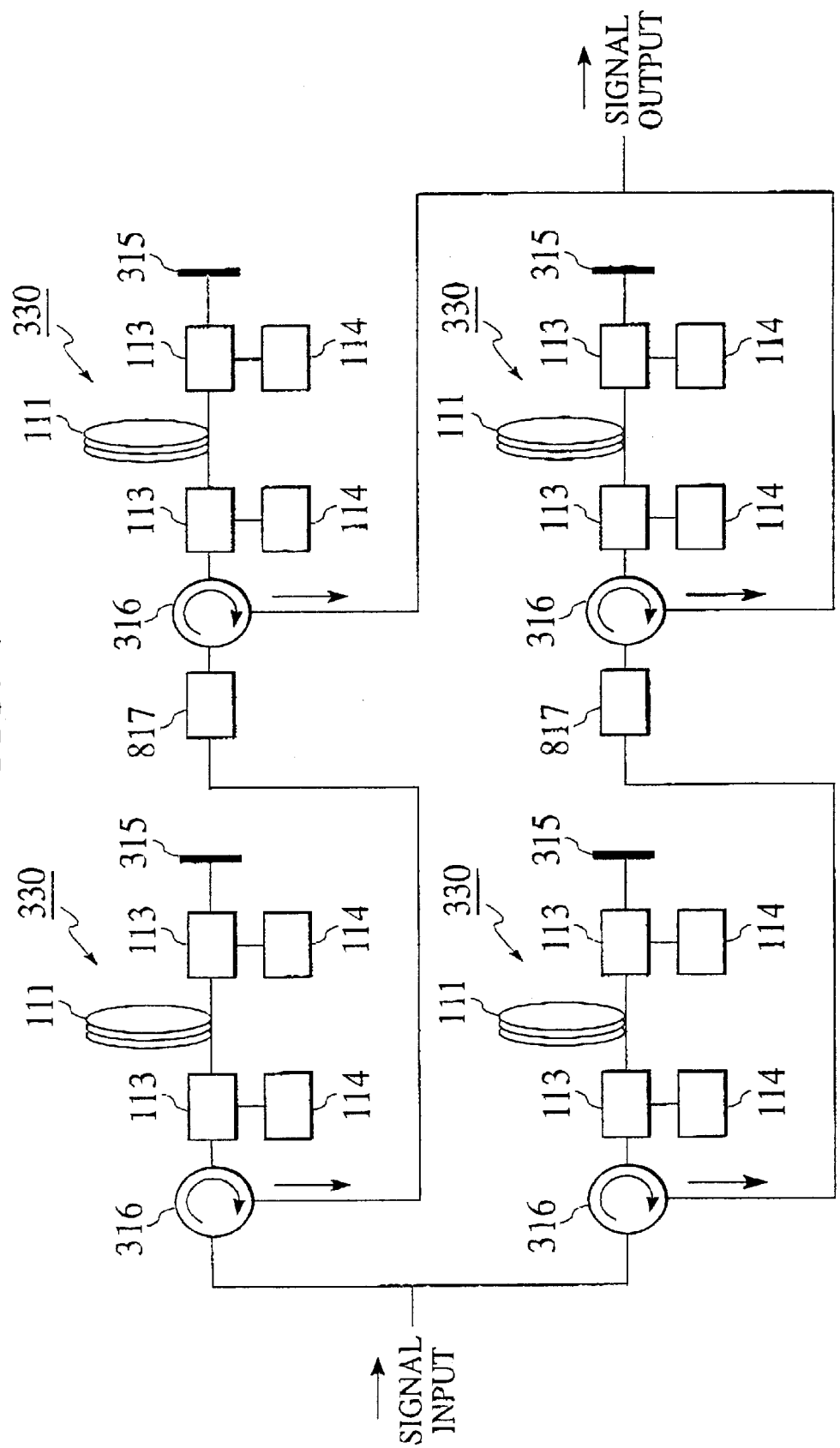
FIG. 27 is a schematic diagram showing another exemplary configuration of an optical fiber amplifier according to the ninth embodiment of the present invention.

Similarly, FIG. 27 shows a schematic configuration of a bidirectional pumping type optical fiber amplifier In which the pump lights 2 are entered along both the same direction and the opposite direction of the propagating direction of the signal light 1, and which has a configuration in which two sets of two amplification optical fibers 330 of the third embodiment described above that are connected in series are connected in parallel, and two gain equalizers 817 are added respectively between the optical fiber amplifier of the first stage and the optical fiber amplifier of the second stage in each of these two sets of two amplification optical fibers 330.

Other Embodiments

In each of the first to ninth embodiments described above, it is also possible to provide a coupler for separating the signal light 1 and the pump light 2.

Also, in each of the first to ninth embodiments described above, the amplification optical fiber 111 having Tm in its core is used, but instead of that, it is also possible to use an amplification optical fiber having Tm in its core and cladding, and the similar effects as in the cases of the first to ninth embodiments described above can be obtained as long as the amplification optical fiber that has Tm at least in its core.

As described, according to the optical fiber amplifier of the present invention, the signal light is pumped by using the pump light of the wavelength in 1400 nm band that is the same as the wavelength band of the signal light that can be emitted by the laser diode (LD), so that it is possible to suppress the occurrence of ESA (Excited State Absorption) from $^3H_4$, so that it is possible to realize a high efficiency in the S-band, a compact size, and a low cost. Also, by using a double pass type configuration or a dual wavelength pumping type configuration, it is possible to realize a higher efficiency.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical fiber amplifier, comprising:
    an amplification optical fiber containing thulium at least in a core at a concentration not less than 3000 ppmwt, to which a signal light is to be entered; and
    a pump light input unit configured to enter at least one pump light with a wavelength in a range of 1320–1520 nm into the amplification optical amplifier.

2. The optical fiber amplifier of claim 1, wherein the pump light input unit enters the at least one pump light with a wavelength in a range of 1320–1480 nm.

3. The optical fiber amplifier of claim 1, wherein the pump light input unit enters the at least one pump light with a wavelength in a range of 1370–1460 nm.

4. The optical fiber amplifier of claim 1, further comprising:
    an auxiliary pump light input unit configured to enter at least one auxiliary pump light with a wavelength in at least one of ranges 630–720 nm, 740–830 nm, 1100–1300 nm, and 1500–2000 nm, into the amplification optical fiber.

5. The optical fiber amplifier of claim 1, further comprising:
    a signal light turnaround propagation unit configured to cause the signal light to propagate forward and backward through the amplification optical fiber.

6. The optical fiber amplifier of claim 5, wherein the signal light turnaround propagation unit is a reflection mirror provided at one end of the amplification optical fiber.

7. The optical fiber amplifier of claim 5, wherein the signal light turnaround propagation unit causes only the signal light, or only the signal light and the at least one pump light, to propagate forward and backward through the amplification optical fiber.

8. The optical fiber amplifier of claim 7, wherein the signal light turnaround propagation unit through which amplified spontaneous emission lights pass.

9. The optical fiber amplifier of claim 1, further comprising:
    an optical isolator or an optical circulator connected to the amplification optical fiber for causing the signal light to propagate only in one direction through the amplification optical fiber.

10. An optical fiber amplifier, comprising:
    a plurality of amplification optical fibers each containing thulium at least in a core at a concentration not less than 3000 ppmwt, to which a signal light is to be entered, the plurality of amplification optical fibers being connected in series or in parallel; and
    a plurality of pump light input units each configured to enter at least one pump light with a wavelength in a range of 1320–1520 nm into a respective one of the amplification optical amplifiers.

11. The optical fiber amplifier of claim 10, further comprising:
    at least one gain equalizer connected to the amplification optical fibers.

* * * * *